US012184791B2

(12) United States Patent
Graefe et al.

(10) Patent No.: US 12,184,791 B2
(45) Date of Patent: Dec. 31, 2024

(54) CLIENT SECURE CONNECTIONS FOR DATABASE HOST

(71) Applicant: SAP SE, Walldorf (DE)

(72) Inventors: Christian Graefe, Leipzig (DE); Fabian Garagnon, Berlin (DE); Kerstin Welk, Berlin (DE); Martin Fei, Berlin (DE)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 17/830,769

(22) Filed: Jun. 2, 2022

(65) Prior Publication Data
US 2023/0396448 A1 Dec. 7, 2023

(51) Int. Cl.
H04L 9/32 (2006.01)
G06F 16/25 (2019.01)
H04L 9/40 (2022.01)

(52) U.S. Cl.
CPC .......... *H04L 9/3263* (2013.01); *G06F 16/252* (2019.01); *H04L 63/04* (2013.01)

(58) Field of Classification Search
None
See application file for complete search history.

(56) References Cited

U.S. PATENT DOCUMENTS

| | | | |
|---|---|---|---|
| 9,413,730 B1* | 8/2016 | Narayan | H04L 63/0471 |
| 10,958,662 B1* | 3/2021 | Sole | H04L 63/0853 |
| 11,140,169 B1* | 10/2021 | Hamel | H04L 63/068 |
| 2017/0222981 A1* | 8/2017 | Srivastav | H04L 63/0428 |
| 2017/0277903 A1* | 9/2017 | Christodorescu | G06F 12/1483 |
| 2017/0295156 A1* | 10/2017 | Spencer | H04L 63/08 |
| 2017/0373860 A1* | 12/2017 | Kshirsagar | H04L 67/02 |
| 2018/0213398 A1* | 7/2018 | Sharif | H04L 63/126 |
| 2018/0287804 A1* | 10/2018 | Geisbush | H04L 63/0442 |
| 2020/0387503 A1* | 12/2020 | Zhang | H04L 67/10 |
| 2021/0219256 A1* | 7/2021 | Sartori | H04W 60/00 |
| 2022/0368528 A1* | 11/2022 | Vennapusa | H04L 9/3073 |

* cited by examiner

*Primary Examiner* — Kaveh Abrishamkar
(74) *Attorney, Agent, or Firm* — SCHWEGMAN LUNDBERG & WOESSNER, P.A.

(57) ABSTRACT

Various examples are directed to systems and methods using a database management system. The database management system may generate a root certificate for a database host of the database management system and a first host certificate using the root certificate. The database management system may receive, from a first client associated with the first tenant, a request to access the root certificate stored at a root certificate storage location and send the root certificate to the first client. The database management system may receive, from the first client, a request to establish a secure communication connection. The secure communication connection with the first client may be established at least in part by providing the first host certificate to the first client.

20 Claims, 15 Drawing Sheets

CLIENT SECURE CONNECTIONS FOR DATABASE HOST

BACKGROUND

Traditional database management system implementations are on-premise installations. In an on-premise installation, a database management system is executed on a computing system maintained by the entity that is using the database management system. The entity may be a business enterprise or other enterprise using the database management system. In a traditional on-premise implementation, secure communications between the database management system and users of the database management system can be handled using the on-premise network.

BRIEF DESCRIPTION OF DRAWINGS

The present disclosure is illustrated by way of example and not limitation in the following figures.

DETAILED DESCRIPTION

Figure 1:
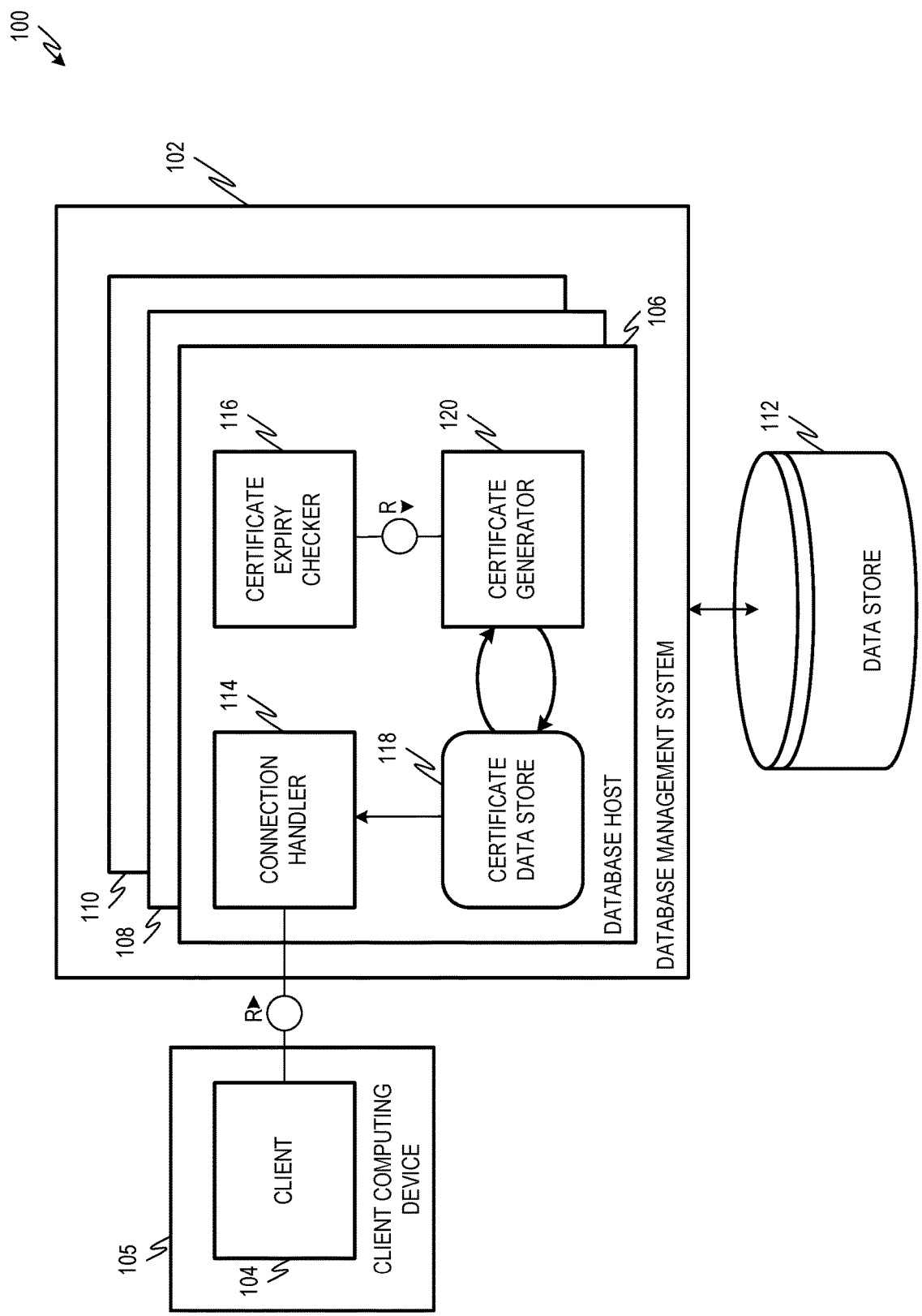
FIG. 1 is a diagram showing one example of an environment for establishing a secure connection between a client 104 and a database host.

In some examples, it is desirable to implement a database management system in a multi-tenant environment. In a multi-tenant environment, a single implementation of a database management system is accessed by users associated with different tenants. The tenants may be business enterprises and/or other arrangements of users that are to access a common instance of the database management system. Users from each tenant may access the database management system via one or more hosts at the database management system. Each host provides users of its associated tenant with access to a unique instance of the database management system.

A multi-tenant database management system may be implemented at a cloud deployment and/or an on-premise deployment. In an on-premise deployment, the database management system is executed at an on-premise computing system maintained by an implementing entity. Different tenants of the on-premise database management system may include user groups associated with the implementing entity and/or users from outside entities who may purchase access to the database management system according to a Software as a Service (SaaS) or similar arrangement. In a cloud deployment, the database management system may be implemented by an implementing entity that may sell or otherwise provide tenancies to various tenant entities according to an SaaS or similar arrangement.

In a multi-tenant database management system, it may be desirable to implement and use secure communication connections between the users and the various hosts. For example, a multi-tenant database management system may be more likely to serve users who are not part of a single on-premise computing system and/or network. Further, even in an on-premise implementation, it may be desirable for the different users associated with different tenants to securely identify and communicate with the appropriate database host or hosts corresponding to their tenants.

In some examples, a client and database host may utilize a secure communication protocol, such as Transport Security Layer (TLS). According to TLS, the database host provides the client with a certificate, such as an X.509 certificate. The client verifies the identity of the database host by verifying the certificate. The database host and client engage in a handshake routine that may involve the exchange of one or more public keys for the client and/or database host. In some examples, the client and database host use the public keys to securely generate a common session key. The session key may be used to establish a secure communication connection according to a symmetric encryption protocol.

Use of TLS or other secure communication protocols with a database management system, however, may involve manual setup. For example, the entity implementing the database management system may obtain a certificate for the respective hosts through a certificate authority and/or may set-up a self-signed certificate arrangement. Because of the manual set-up for using TLS or similar secure communication protocols, secure communication connections between clients and database hosts may not be available "out-of-the-box" when the database management system is set-up.

These and other challenges may be addressed utilizing a database management system and/or client computing device in the manner described herein. For example, the database management system may generate a root certificate and one or more host certificates. Each host certificate may correspond to one or more hosts. In some examples, host certificates are generated to correspond to tenants of the database management system. For example, the host certificate for a tenant may reference all of the database hosts used by that tenant.

A client (e.g., associated with a user) may request that a database host provide the root certificate. In response, the database host may provide its root certificate to the client. With the client having the root certificate, the client and/or database host may initiate a secure communication connection. To establish the secure communication connection, the database host provides its host certificate, for example, as part of a TLS handshake or other suitable protocol. In some examples, the host certificate references the database host and also one or more other database hosts used by the tenant with which the client is associated. The client may utilize its locally-stored root certificate to verify the host certificate provided by the database host. The client and database host may generate a session key that may be utilized to facilitate the secure communication connection between the two components.

Various different techniques may be used to provide the root certificate to the client. In some examples, the client has prior knowledge of the database host and the prior knowledge is used to verify the database host and obtain the root certificate. For example, the client may have prior knowledge of the database host including an address of the database host (a database host address) and a root certificate storage location. For example, the database location may be a table, a particular record at a particular table, a view, and/or the like. The client may request a preliminary communication connection with the database host at the database host address. In some examples, the preliminary communication connection is established utilizing TLS or a similar secure protocol. When the preliminary communication protocol is established, the client may request that the database host produce the contents of the root certificate storage location. For example, if the root certificate storage location is a view, the client may query the database host to generate and provide the view. Because the client is not yet in possession of the root certificate when the preliminary communication protocol is established, it may not verify a host certificate for the database host during the handshake process. Instead, the client may verify the identity of the database host using its prior knowledge of the database host address and the presence of the root certificate at the view, table, record, or other database location indicated by the client's prior knowledge of the root certificate storage location.

In another example, the client may have prior knowledge of an administrator account at the database host and of a storage location. For example, the client may possess administrator credential data for the administrator account. The root certificate storage location may be, for example, a limited-access location that is accessible to the administrator account and not accessible to other accounts at the database host. The client may utilize a secure shell protocol (SSH) or other suitable secure protocol to login to the database host using the administrator credential data. Once logged-in, the client may retrieve the root certificate from the root certificate storage location at the database host. The client may verify the identity of the database host based on the database host permitting the login using the administrator account credential data and the presence of the root certificate at the indicated location.

FIG. 1 is a diagram showing one example of an environment 100 for establishing a secure connection between a client 104 and a database host 106. The database host 106 is one host implemented by a database management system 102. The database management system 102 may be or include any suitable database management system such as, for example, the HANA™ database management system from SAP SE of Walldorf, Germany or a similar database management system.

The database management system 102 may be implemented in a cloud deployment and/or an on-premise deployment. In a cloud deployment, the database management system 102 is implemented in a cloud environment using computing hardware resources provided by a cloud provider. Examples of currently available cloud providers may include AWS' from Amazon.com, Inc., Google Cloud™ from Google LLC., Azure™ from Microsoft, Inc., and Alibaba Cloud™ from Alibaba Group Holding Limited, among others. In an on-premise deployment, the database management system 102 is implemented in an on-premise deployment, for example, using an on-premise computing system maintained by an implementing entity.

In various examples, the database management system 102 is arranged to support multiple tenants. Each tenant is associated with a set of one or more users that access the database management system 102. In some examples, data stored for one tenant is not accessible to users associated with other tenants. To support multiple tenants, the database management system 102 may include one or more database hosts 106, 108, 110. Each database host 106, 108, 110 may be associated with a tenant. In some examples, there is a one-to-one relationship between database hosts 106, 108, 110 and tenants. In other examples, a single tenant may be associated with more than one database host 106, 108, 110. Although three database hosts 106, 108, 110 are shown in FIG. 1, a database management system 102 may have more or fewer database hosts.

The various database hosts 106, 108, 110 may provide access to the database management system 102 for users via various clients, such as the client 104. For example, the database host 106 may manage communications between clients, such as the client 104, the database management system including, for example, secure communication connections according to TLS, SSH, or any other suitable protocol. Database hosts 106, 108, 110 may be or include one or more computing devices, such as servers. In some examples, database hosts 106, 108, 110 are implemented as software components such as, for example, one or more virtual machines, one or more container-executed components, and/or the like. Although only one client 104 is shown in FIG. 1, it will be appreciated that some database hosts 106, 108, 110 may manage communications with multiple clients. For example, in some examples, each user associated with a given tenant may utilize a separate client to access the database host 106. Also, in some examples, database hosts 108, 110 may communication with users from their associated tenants via one or more other clients, not shown in FIG. 1.

In the example of FIG. 1, the database host 106 comprises various components including a connection handler 114, a certificate expiry checker 116, a certificate generator 120 and a certificate data store 118. The connection handler 114, certificate expiry checker 116 and client certificate handler may be or include software components executed as part of the database host 106. The certificate data store 118 may be a data storage location accessible to the database host 106 that stores one or more certificates, such as root certificates and/or host certificates as described herein. In some examples, the certificate data store 118 is a secure data storage location that may be accessible to a subset of users, such as administrative users, as described herein. In some examples, the certificate data store 118 is or includes a portion of the data store 112 used by the database management system 102 to store tenant data. For example, all or part of the certificate data store 118 may be or include a table, view, or other database artifact stored by the database management system 102 at the data store 112.

FIG. 1 shows one example client 104, which may be associated with one or more users of a particular tenant and may communicate with the database management system 102 via the database host 106. The client 104 executes at a client computing device 105. The client computing device 105 may be any suitable computing device, such as a server computer, a desktop computer, a laptop computer, a mobile computing device, and/or the like. The client 104 and client computing device 105 may be associated with a single user of the associated tenant and/or with multiple users of the associated tenant. For example, the client computing device 105 may be a personal computing device used by a user of the associated tenant to access the database management system 102 via the client 104. In another example, the client computing device 105 and client 104 are implemented as a server to permit multiple users of the associated tenant to access the database management system 102. For example, the users may utilize user computing devices to access the client computing device 105 and ultimately the database management system 102 via the client 104.

In some examples, the client 104 is provided by an entity that implements the database management system 102, for example, via download, disk, or other suitable data storage and/or transport mechanism. For example, the client 104 may be provided with prior knowledge of the database host 106. For example, the prior knowledge of the database host 106 may be hard-coded in the client 104 and/or otherwise provided with the client 104.

The client 104 may use the prior knowledge of the database host 106 to obtain a root certificate for the database host 106. The client 104 may use the root certificate to establish subsequent secure communication connections with the database host 106. For example, the client 104 may use the root certificate to verify a host certificate provided by the database host 106 during a handshake or similar protocol to establish a secure communication connection.

In some examples, the prior knowledge of the database host 106 includes an address of the database host 106 and a root certificate storage location. The address may be any suitable address such as, for example, a Universal Resource Locator (URL), an Internet Protocol (IP) address and/or the like. The root certificate storage location is a location at the database management system 102 where the root certificate for the database host 106 is stored. In some examples, the root certificate storage location may be all or part of a database artifact stored by the database management system 102 at the data store 112. For example, the root certificate storage location may be or include a view generated by the database management system 102, a table stored by the database management system 102, a record at a table stored by the database management system 102 and/or the like.

To obtain the root certificate, the client 104 may request a preliminary communication connection with the database host 106. The client 104 and database host 106 may establish the preliminary communication connection utilizing a TLS handshake or other suitable protocol. At the time of the preliminary communication connection, the client 104 may not yet have obtained the root certificate of the database host 106. Accordingly, the client 104 may not verify any certificate provided by the database host 106 during the TLS handshake or other suitable connection protocol. Accordingly, the client 104, in some examples, is programmed to proceed with the preliminary communication connection without verifying a certificate from the database host 106. In some examples, depending on the protocol used, the client 104 will utilize a certificate received from the database host 106 to generate a session key without verifying the certificate from the database host 106. In other examples, the client 104 and/or database host 106 may be programmed to establish the preliminary communication connection without a certificate provided by the database host 106.

When the preliminary communication connection is established, the client 104 may request the contents of the root certificate storage location. For example, when the root certificate storage location is a view, the client 104 may request, via the database host 106, that the database management system 102 generate the indicated view. In examples where the root certificate storage location is a table and/or record stored at a table, the client 104 may query the database management system 102, via the database host 106 to provide the table and/or record.

In this example, the client 104 may verify the database host 106 using its prior knowledge of the database host 106. For example, the client 104 may verify the database host 106 if the database host 106 is present at the database host address and if the root certificate is present at the root certificate storage location. Provided that the client 104 verifies the database host 106 in this way, the client 104 may use the received root certificate to establish subsequent secure communication connections with the database host 106 as described herein.

In some examples, the client's prior knowledge of the database host 106 includes administrator credential data and a root certificate storage location at the database host 106. The administrator credential data may include, for example, a username, password and/or other credential data for logging-in to the database host 106 under an administrator account. The administrator account may be an account at the database host 106 that is associated with a set of privileges at the database host 106.

In some examples, one of the privileges associated with the administrator account may be access (e.g., read access) to the root certificate storage location. For example, the root certificate storage location may be or include a secure directory at the database host 106 (e.g., the certificate data store 118 thereof). The secure directory may be accessible to the administrator account and, in some examples, may not be accessible to one or more other accounts at the database host 106 that do not have the same privileges and the administrator account.

In various examples, the client 104 may utilize the administrator credential data to log-in to the database host 106, thereby establishing a preliminary communication connection under the administrator account. Any suitable protocol may be used to log-in to the database host 106 such as, for example, SSH. Once the client 104 is logged-in to the database host 106, the client 104 may request the root certificate from the root certificate storage location. Because the administrator account has access to the root certificate storage location, the database host 106 may reply to the request by providing the client 104 with the root certificate. In this example, the client 104 verifies the database host 106 based on the ability to log-in to the database host 106 using the administrator account credential data and the presence of the root certificate at the root certificate storage location.

Upon receiving the root certificate from the database host 106, the client 104 may import the root certificate to a trust store of the client 104. The client 104 may utilize the root certificate with the database host 106 to establish subsequent secure communication connections to the database host 106.

The connection handler 114 of the database host 106 may be a component that manages connections between the database host 106 and the client 104. For example, the connection handler 114 may be programmed to generate connections with the client 104 using any suitable protocol such as, for example, TLS and/or SSH. The connection handler 114, as shown, is in communication with the certificate data store 118. For example, the connection handler 114 may access one or more host certificates during establishment of a communication connection according to a TLS handshake or similar protocol.

The certificate generator 120 may be configured to generate one or more certificates for the database host 106. In some examples, the certificate generator 120 generates a root certificate and one or more host certificates. (In other examples, the root certificate is generated by the database management system 102 and provided to the database host 106, for example, upon startup of the database host 106.) The certificate generator 120 may generate one or more host certificates based on the root certificate. For example, the certificate generator 120 may cryptographically sign a host certificate using the root certificate.

The certificate expiry checker 116 may be programmed to monitor the status of certificates at the database host 106. For example, the host certificate for the database host 106 may be configured to expire at a predetermined interval (e.g., 180 days). Upon expiration of the host certificate, the certificate expiry checker 116 may prompt the certificate generator 120 to generate a new host certificate using the root certificate.

Figure 2:
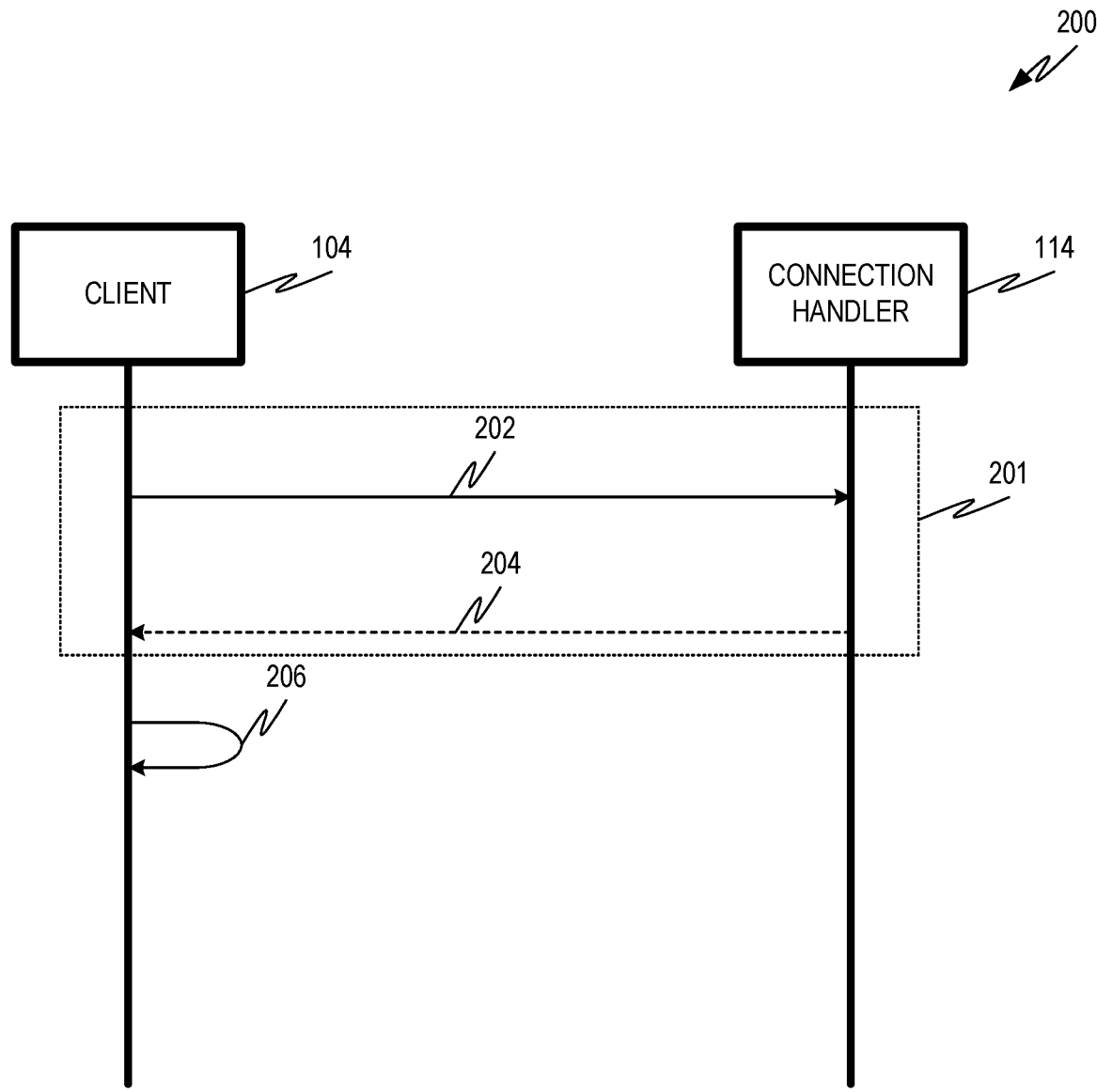
FIG. 2 is swim lane diagram showing example interactions between the client and database host of FIG. 1 to provide the client with the root certificate for the database host.

FIG. 2 is swim lane diagram 200 showing example interactions between the client 104 and the database host 106 (e.g., the connection handler 114 thereof) to provide the client 104 with the root certificate for the database host 106. The client 104 and connection handler 114 may establish a preliminary communication connection 201. Via the preliminary communication connection, the client 104 may send a request 202 for the root certificate used by the database host 106. The connection handler 114 may send a reply 204 including the root certificate. The client 104 may use its prior knowledge of the database host 106 to establish the preliminary communication connection and to verify the identity of the database host 106. Examples providing additional details of establishing the preliminary communication connection and verifying the database host 106 are provided herein, for example, at FIGS. 4 and 5.

After the client 104 has received the root certificate being used by the database host 106 and verified the identity of the database host 106, it may store the root certificate to a trust store for use in subsequent communications with the database host 106, at operation 206. Any suitable protocol may be used to import the root certificate to the trust store such as, for example, sapgenpse available from SAP SE of Walldorf, Germany, OpenSSL, and/or any other suitable operating system tools. In some examples, the root certificate may be received as a text file and stored at the client 104.

Figure 3:
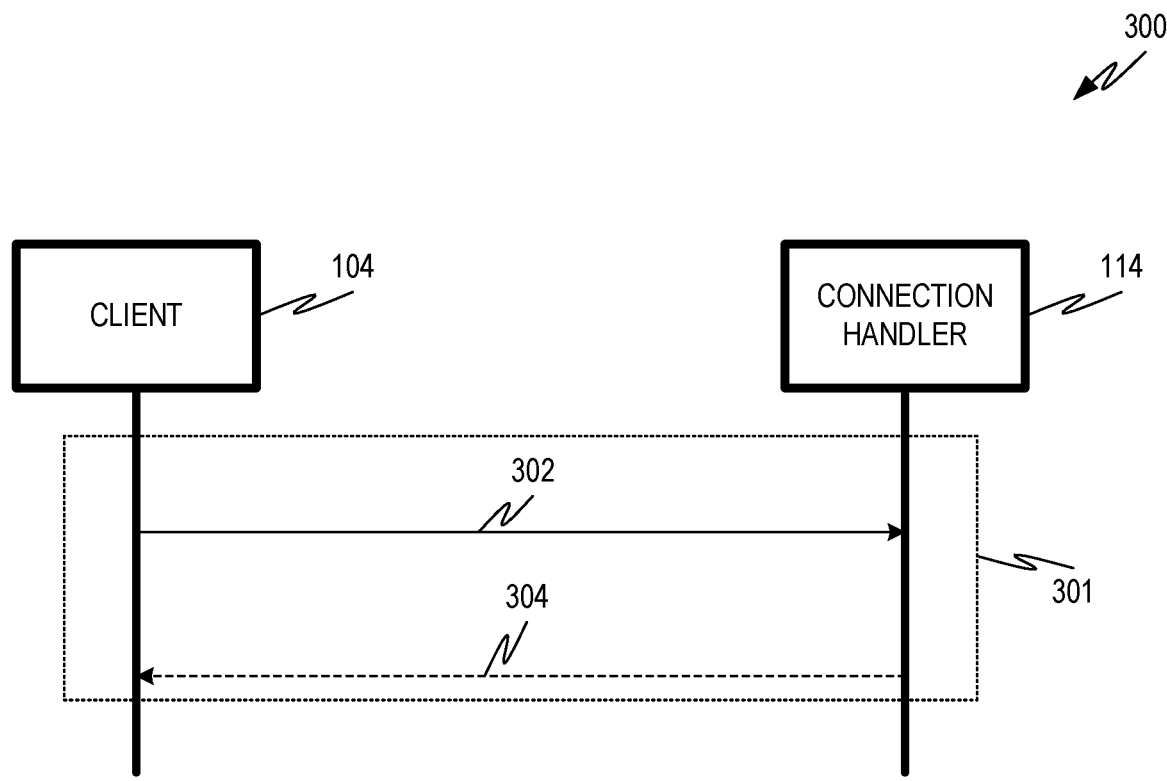
FIG. 3 is a swim lane diagram showing example interactions between the client and the database host of FIG. 1 to establish a secure communication connection.

FIG. 3 is a swim lane diagram 300 showing example interactions between the client 104 and the database host 106 (e.g., the connection handler 114 thereof) to establish a secure communication connection 301. For example, the swim lane diagram 300 may occur after the client 104 has received the root certificate from the database host 106. The client 104 may send a message 302 requesting the secure communication connection 301. In response the database host 106 may send a reply message 304. The reply message 304 may include a host certificate for the database host 106. The host certificate may have been generated using the root certificate. For example, the host certificate may include a public key of the database host and may be cryptographically signed using the root certificate. The client 104 may verify the host certificate using the previously-obtained root certificate. For example, the client 104 may recreate the cryptographic signature of the public key of the database host 106 and compare to the contents of the host signature. Provided that there is a match, the client 104 may proceed with the secure communication connection 301.

In some examples, the request message 302 and the reply message 304 are part of a handshake protocol according to TLS or another suitable protocol. Also, although one message 302 from the client 104 to the connection handler 114 and one message 304 from the database host 106 to the client 104 is shown in FIG. 3, it will be appreciated that some handshake protocols for establishing secure communication connections may involve additional messages. At the conclusion of the handshake process including request message 302 and reply message 304 the client 104 and database host 106 may be in possession of a common session key that is used to implement symmetric encryption for the secure communication connection 301.

The swim lane diagrams 200 and 300 of FIGS. 2 and 3 show interactions between the database host 106 and a single client 104. It will be appreciated, however, that the database host 106 may support multiple clients and, therefore, may have interactions similar to those described by swim lane diagrams 200 and 300 with multiple different clients. Also, in some examples, other database hosts 108, 110 of the database management system 102 may have similar interactions with one or more clients associated with tenants supported by those database hosts 108, 110.

Figure 4:
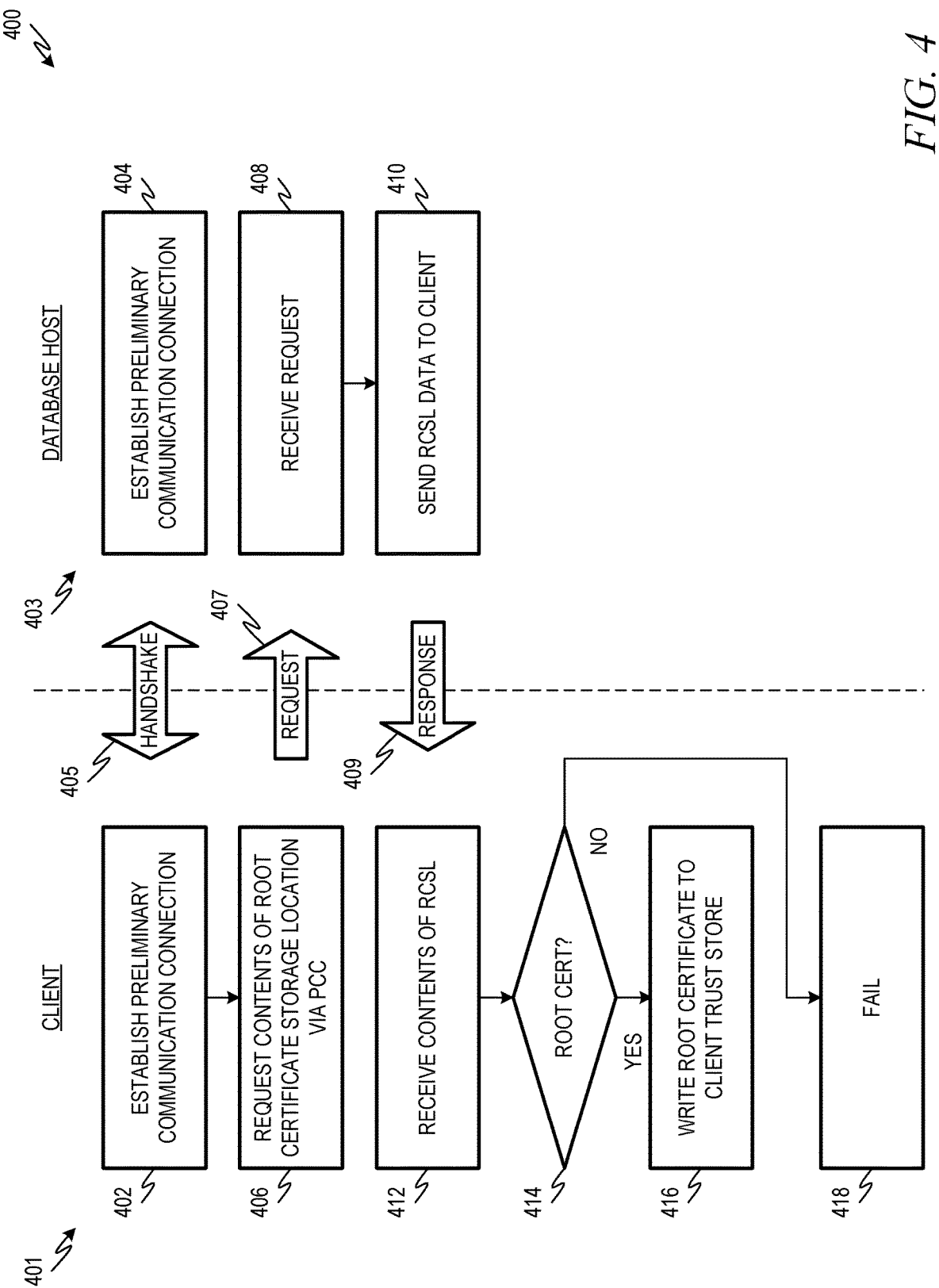
FIG. 4 is a flowchart showing one example of a process flow that may be executed in the environment of FIG. 1 to provide the root certificate to the client.

FIG. 4 is a flowchart showing one example of a process flow 400 that may be executed in the environment 100 of FIG. 1 to provide the root certificate to the client 104. The process flow 400 includes two columns. A column 401 includes operations that may be executed by the client 104 and the column 403 includes operations that may be executed by the database host (e.g., the connection handlers 114 thereof). The process flow 400 describes an example arrangement where the client 104 includes prior knowledge of the database host 106 including a database host address and a root certificate storage location.

At operation 402, the client 104 establishes a preliminary communication connection with the database host 106. For example, the client 104 may initiate a handshake process 405, such as a TLS handshake process. The client 104 may initiate the handshake process 405, for example, by sending a message to the database host at the database host address that is part of the client's prior knowledge of the database host 106.

The database host 106 may participate in the establishing of the preliminary communication connection at operation 404. For example, the database host 106 may provide a host certificate including a copy of the database host's public key signed with the root certificate being used by the database host 106. Because the client 104 may not yet possess the root certificate, it may not verify the host certificate of the database host 106 during the handshake process 405. The result of the handshake process 405 may be the preliminary communication connection with both the client 104 and the database host 106 (e.g., the connection handler 114 thereof) in possession of a common session key that can be used for symmetric encryption for the preliminary communication connection.

At operation 406, the client 104 sends to the database host 106 a request 407 for the contents of the root certificate storage location. Recall that, in this example, the root certificate storage location was part of the prior knowledge of the database host 106 held by the client 104. The root certificate storage location may be, for example, a database artifact at the database management system 102 such as, for example, a view, a table, a record at a table, and/or the like. Accordingly, in some examples, the request 407 may be or include a query to the database management system 102 to generate a database artifact (such as a view) and/or provide the contents of a database artifact (such as a table or record at a table).

The database host 106 receives the request 407 at operation 408. The database host accesses the storage location indicated by the request 407 and, at operation 410, returns the results to the client 104 with a response message 409. The response message 409 may include the contents of the root certificate storage location such as, for example, the request view, the requested database table, the requested record or records from the database table, and/or the like.

The client 104 receives the response message 409 including the contents of the root certificate storage location at operation 412. At operation 414, the client 104 determines whether the response message 409 included the root certificate for the database host 106. For example, the root certificate for the database host 106 may have a particular format, for example, according to an X.509 protocol. If the expected root certificate is present in the response message 409, the client may write the root certificate to the client trust store at operation 416, for example, as described herein. If the expected root certificate is not present in the response message 409, the client 104 may fail the validation of the database host 106 at operation 418. For example, if the root certificate is not present in the response message 409 it may indicate that the actual state of the database host 106 does not match the client's prior knowledge of the database host 106.

Figure 5:
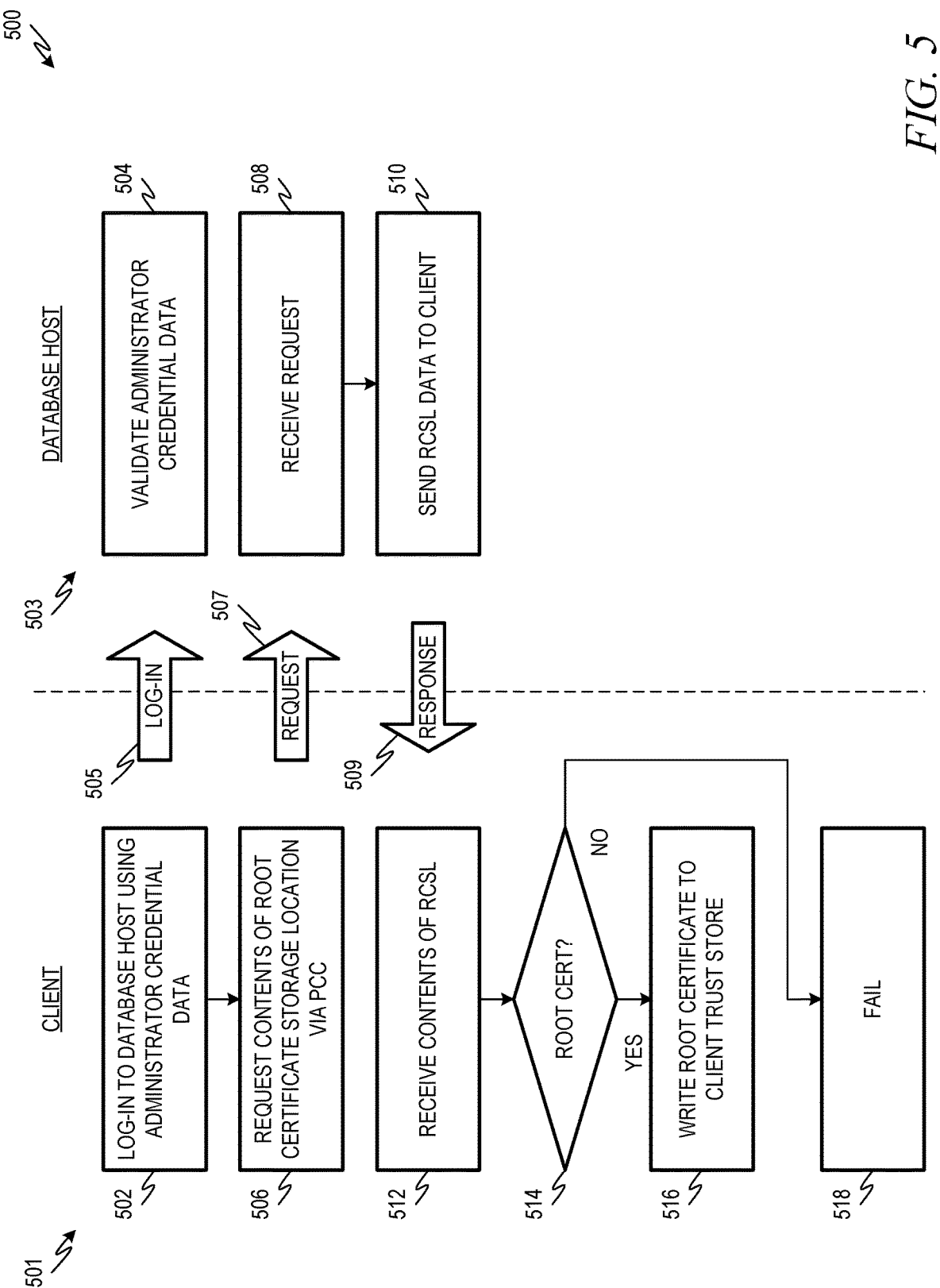
FIG. 5 is a flowchart showing another example of process flow that may be executed in the environment of FIG. 1 to provide the root certificate to the client.

FIG. 5 is a flowchart showing another example of process flow 500 that may be executed in the environment 100 of FIG. 1 to provide the root certificate to the client 104. The process flow 500 includes two columns. A column 501 includes operations that may be executed by the client 104 and the column 503 includes operations that may be executed by the database host (e.g., the connection handlers 114 thereof). The process flow 500 describes an example arrangement where the client 104 includes prior knowledge of the database host 106 including administrator account credential data and a root certificate storage location.

At operation 502, the client 104 logs-in to the database host 106 using the administrator credential data. The log-in can include sending a log-in message 505 including the administrator account credential data. The log-in, in some examples, is conducted according to SSH or a similar protocol. The database host 106 validates the administrator account credential data at operation 504.

At operation 506, the client 104 sends to the database host 106 a request 507 for the contents of the root certificate storage location. Recall that, in this example, the root certificate storage location was part of the prior knowledge of the database host 106 held by the client 104. In this example, the root storage location may be at a secure directory at the database host 106 (and/or the database management system 102). The administrator account may have privileges to access the secure directory. In some examples, the database host 106 may support other non-administrator accounts that do not have access to the root certificate storage location. In an example LINUX implementation, the administrator account may be an OS user <sid> adm account and the root certificate storage location may be at the $SECUDIR directory, for example, at $SECUDIR/clientpki_<dbname>.cer. In some examples, the certificate secure locatin that may be used by a SystemDB client is given by $SECUDIR/clientpki_<SYSTEMDB>.cer.

The database host 106 receives the request 507 at operation 508. The database host accesses the storage location indicated by the request 507 and, at operation 510, returns the results to the client 104 with a response message 509. The response message 509 may include the contents of the root certificate storage location, for example, retrieved from a secure directory associated with the administrator account, as described herein.

The client 104 receives the response message 509 including the contents of the root certificate storage location at operation 512. At operation 514, the client 104 determines whether the response message 509 included the root certificate for the database host 106. For example, the root certificate for the database host 106 may have a particular format, for example, according to an X.509 protocol. If the expected root certificate is present in the response message 509, the client may write the root certificate to the client trust store at operation 516, for example, as described herein. If the expected root certificate is not present in the response message 509, the client 104 may fail the validation of the database host 106 at operation 518. For example, if the root certificate is not present in the response message 509 it may indicate that the actual state of the database host 106 does not match the client's prior knowledge of the database host 106.

Figure 6:
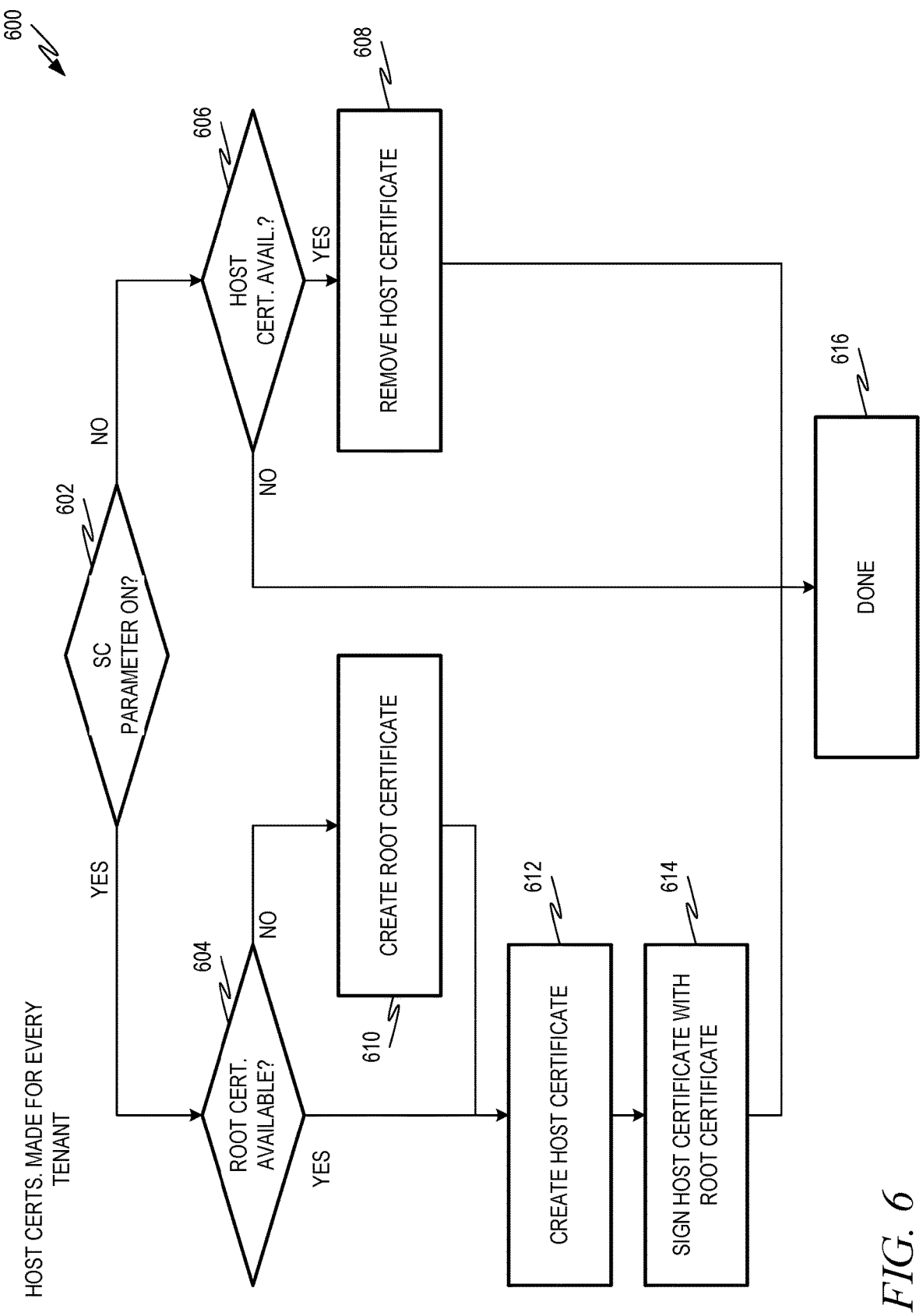
FIG. 6 is a flowchart showing one example of a process flow that may be executed by the database host of FIG. 1 to configure itself for secure communication connections.

FIG. 6 is a flow chart showing one example of a process flow 600 that may be executed by the database host 106, for example, to configure itself for secure communication connections. In some examples, the process flow 600 is executed upon the startup of the database host 106. At operation 602, the database host 106 determines whether a secure communication parameter is active or turned on. The secure communication parameter may indicate whether the database host 106 is to be configured to establish secure communication connections, for example, in the manner described herein.

If the secure communication parameter is not on, the database host 106 may determine, at operation 606, whether the certificate data store 118 includes a host certificate for its associated tenant. If no host certificate is available, the process flow 600 may end at operation 616. If a host certificate is available, the database host 106 may, at operation 608, remove the host certificate from the certificate data store 118, for example, by deleting the host certificate. The database host 106 may optionally remove the root certificate as well and/or may leave the root certificate to facilitate enabling or re-enabling the secure communication feature at a later time.

If the secure communication parameter is on at operation 602, the database host 106 may determine, at operation 604, if a root certificate is available. This may include examining the certificate data store 118 to determine if a root certificate is present and/or examining another location at the database management system 102 for the presence of the root certificate. If no root certificate is present at operation 604, the database host 106 (e.g., the certificate generator 120 thereof) may generate the root certificate at operation 610. In some examples, the database host 106 may request that the database management system 102 or another component thereof generate the root certificate.

If a root certificate is available at operation 604 and/or after generating a root certificate at operation 610, the database host 106 (e.g., the certificate generator 120 thereof) may create a host certificate at operation 612. The host certificate may include, for example, a public key of the database host 106. At operation 614, the database host 106 (e.g., the certificate generator 120 thereof) may sign the host certificate using the root certificate. This may include, for example, performing a cryptographic operation on all or part of the host certificate using the root certificate. The host certificate may be stored at the certificate data store 118 and the process flow 600 may conclude at operation 616.

Figure 7:
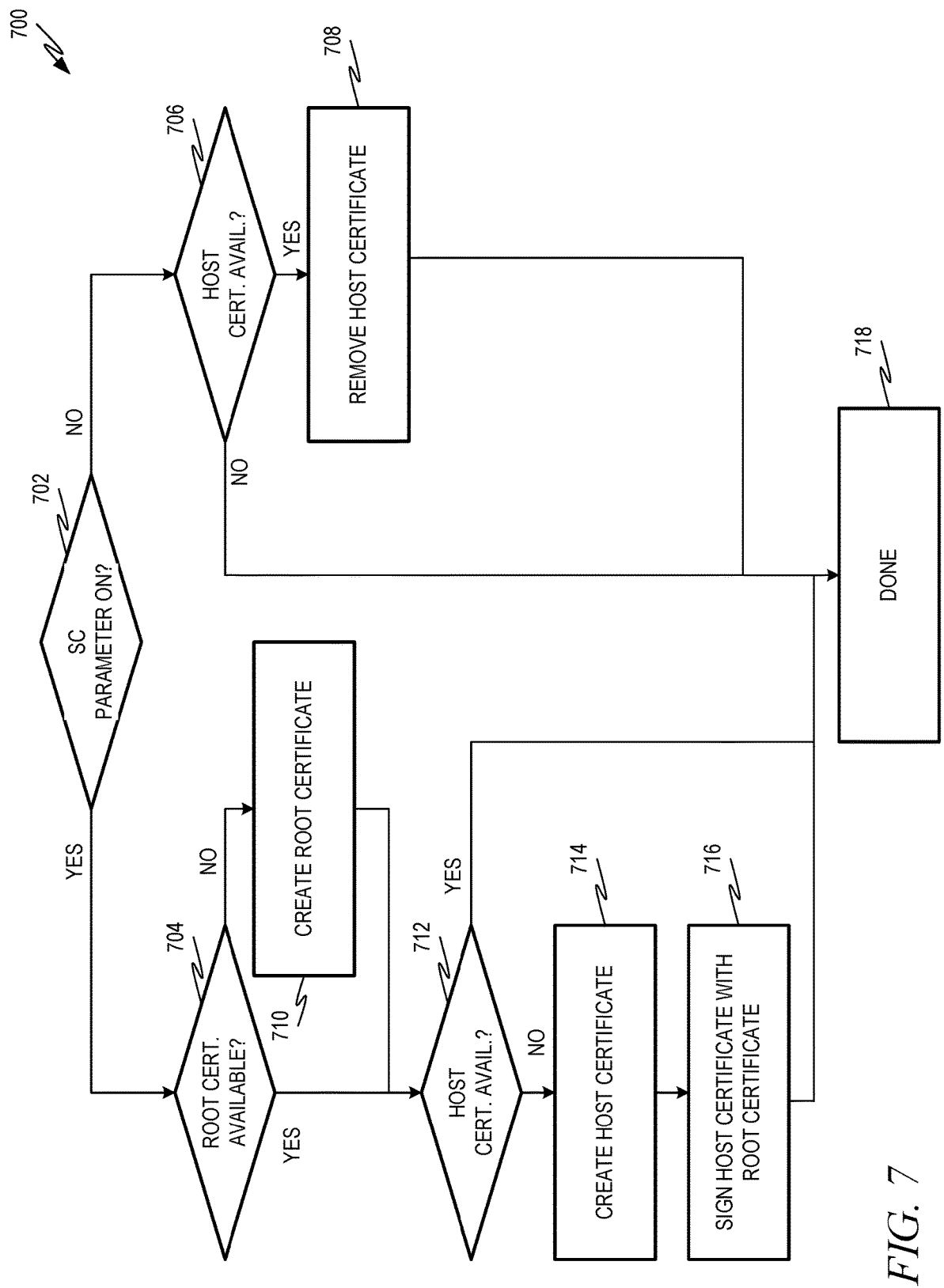
FIG. 7 is a flowchart showing another example of a process flow that may be executed by the database host of FIG. 1 to configure itself for secure communication connections.

FIG. 7 is a flowchart showing another example of a process flow 700 that may be executed by the database host 106, for example, to configure itself for secure communication connections. In some examples, the process flow 700 is executed upon the startup of the database host 106. At operation 702, the database host 106 determines whether a secure communication parameter is active or turned on. The secure communication parameter may indicate whether the database host 106 is to be configured to establish secure communication connections, for example, in the manner described herein.

If the secure communication parameter is not on, the database host 106 may determine, at operation 706, whether the certificate data store 118 includes a host certificate for its associated tenant. If no host certificate is available, the process flow 700 may end at operation 718. If a host certificate is available, the database host 106 may, at operation 708, remove the host certificate from the certificate data store 118, for example, by deleting the host certificate. The database host 106 may optionally remove the root certificate as well and/or may leave the root certificate to facilitate enabling or re-enabling the secure communication feature at a later time.

If the secure communication parameter is on at operation 702, the database host 106 may determine, at operation 704, if a root certificate is available. This may include examining the certificate data store 118 to determine if a root certificate is present and/or examining another location at the database management system 102 for the presence of the root certificate. If no root certificate is present at operation 704, the database host 106 (e.g., the certificate generator 120 thereof) may generate the root certificate at operation 710. In some examples, the database host 106 may request that the database management system 102 or another component thereof generate the root certificate.

If a root certificate is available at operation 704 and/or after generating a root certificate at operation 710, the database host 106 (e.g., the certificate generator 120 thereof) may determine, at operation 712, whether a host certificate for the database host 106 is available, for example, at the certificate data store 118. A host certificate may be available, for example, if the database host 106 (e.g., the certificate generator 120 thereof) has already generated a host certificate, for example, at a previous start up. In some examples, determining whether the host certificate is available may also include determining whether an available host certificate is valid (i.e., not expired or having less than a threshold age). If the host certificate is not valid (e.g., expired or greater than a threshold age), then the database host 106 may determine that a valid host certificate is not available. If a valid (e.g., unexpired) host certificate is available, the process flow 700 may conclude at operation 718.

If no host certificate is available at operation 712, the database host 106 (e.g., the certificate generator 120 thereof) may generate a host certificate at operation 714. At operation 716, the database host 106 (e.g., the certificate generator 120 thereof) may sign the host certificate using the root certificate. The host certificate may be stored at the certificate data store 118 and the process flow 700 may conclude at operation 716.

Figure 8:
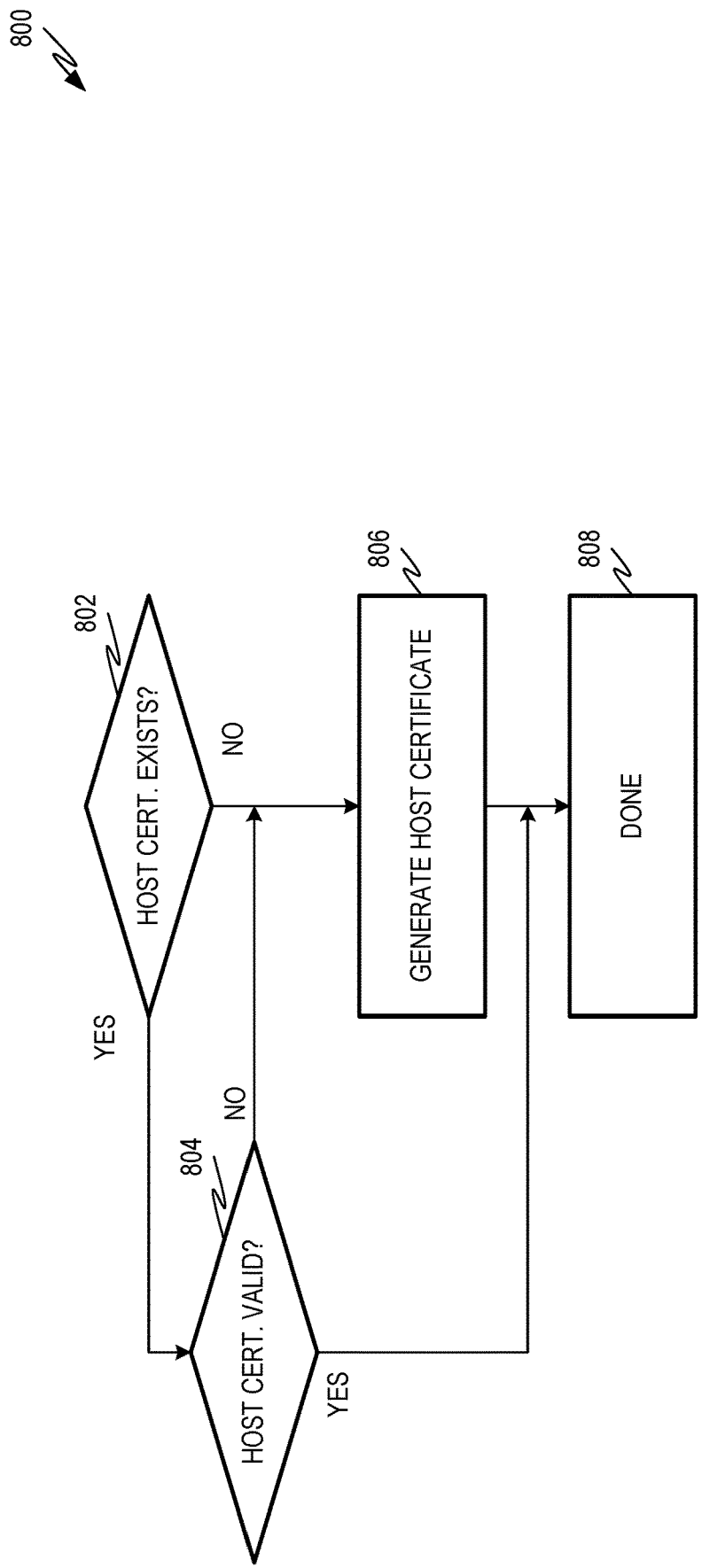
FIG. 8 is a flowchart showing one example of a process flow that may be performed by the database host to maintain the certificate data store.

FIG. 8 is a flowchart showing one example of a process flow 800 that may be performed by the database host 106 to maintain the certificate data store 118. In some examples, the process flow 800 may be performed periodically, such as daily, weekly, every two days, and/or the like. At operation 802, the database host 106 (e.g., the certificate expiry checker 116 thereof) may determine if the host certificate for the database host 106 exists. This may include, for example, determining whether a host certificate is stored at the certificate data store 118. If a host certificate is present, the database host 106 (e.g., the certificate expiry checker 116 thereof) may determine at operation 804 whether the host certificate is valid. A host certificate may be valid, for example, if it is not expired. A host certificate may be expired, for example, if it has an age that is greater than a threshold age. If the host certificate is valid at operation 804, the process flow 800 may conclude at operation 808.

If no host certificate exists at operation 802 and/or an existing host certificate is not valid at operation 804, the database host 106 (e.g., the certificate generator 120 thereof) may generate a host certificate at operation 806, for example, as described herein. The process flow 800 may conclude at operation 808.

Figure 9:
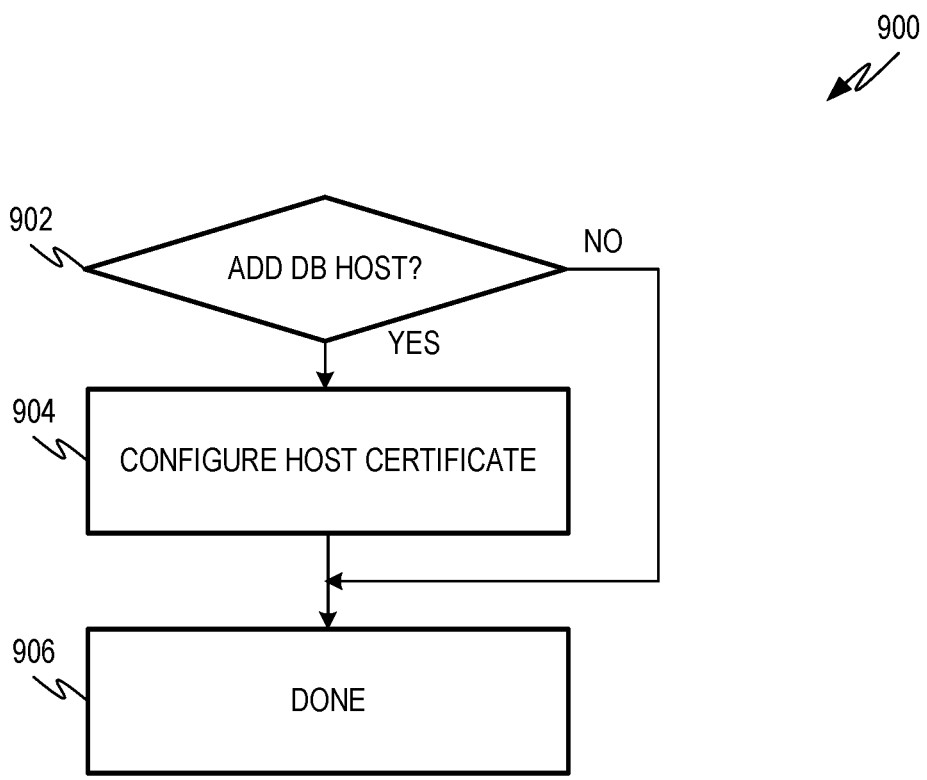
FIG. 9 is a flowchart showing one example of a process flow that may be executed by the database management system of FIG. 1 to add a database host.

FIG. 9 is a flowchart showing one example of a process flow 900 that may be executed by the database management system 102 to add a database host 106, 108, 110. A database host 106, 108, 110 may be added to the database management system 102, for example, to support a new tenant, to provide additional support to an existing tenant, and/or based on load balancing at the database management system. At operation 902, the database management system 102 determines if it is to add a database host 106, 108, 110. If no database host 106, 108, 110 is to be added, the process flow 900 may end at operation 906. If a database host 106, 108, 110 is to be added, the database management system may configure host certificates for one or more tenants to indicate the newly-added database host 106, 108, 110.

In some examples, the database management system 102 creates a new host certificate for one or more tenants, where the new host certificate references the new database host 106, 108, 110. For example, the database management system 102 may access host certificates for one or more tenants that will use the new database host 106, 108, 110. The database management system may replace the host certificates for the one or more tenants with new host certificates that include the host name of the new database host 106, 108, 110. In some examples, the database management system also starts up the new database host 106, 108, 110 and/or prompts the new database host 106, 108, 110 to execute a process flow similar, for example, to the process flow 600 and 700 of FIGS. 6 and 7. After the host certificates are generated and/or updated to reference the new database host 106, 108, 110, the process flow 900 may conclude at operation 906.

Figure 10:
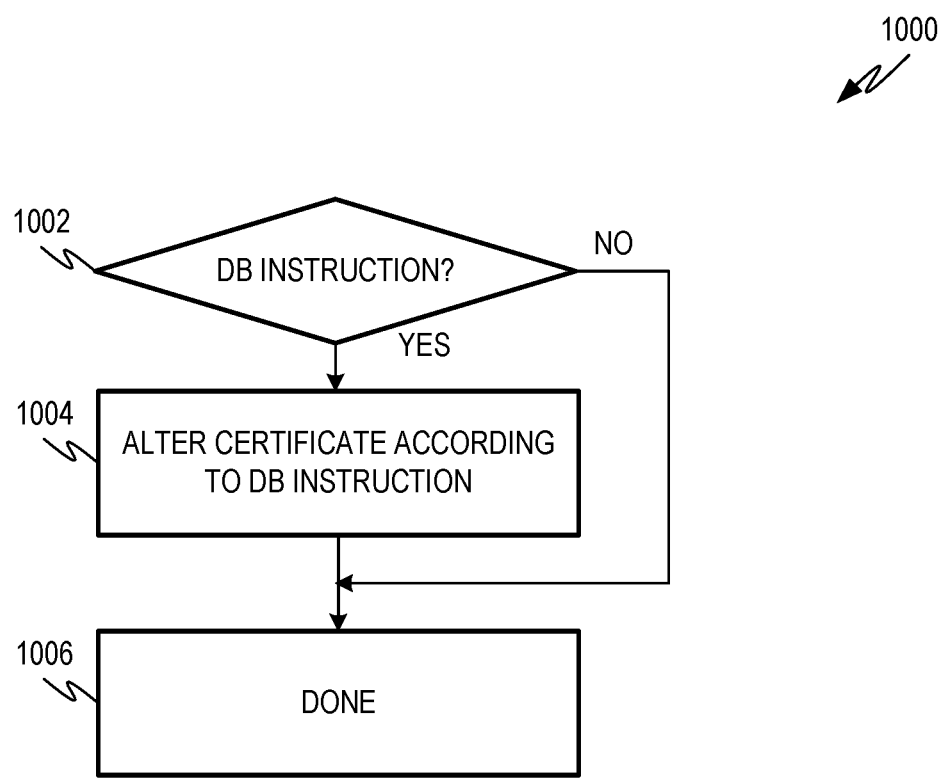
FIG. 10 is a flowchart showing one example of a process flow that may be executed by the database management system of FIG. 1 to modify certificates at the database management system or one or more database hosts using database instructions

FIG. 10 is a flowchart showing one example of a process flow 1000 that may be executed by the database management system 102 to modify certificates at the database management system 102 or one or more database hosts 106, 108, 110 using database instructions, such as Structured Query Language (SQL) instructions or other suitable database instructions.

At operation 1002, the database management system 102 determines whether it has received a database instruction. The database instruction may be received from a tenant's user via the client 104 and/or another client. Also, in some examples, the database instruction may be received from a user, such as an administrative user, logged in directly to the database management system 102 and/or a database host 106, 108, 110 thereof. If no database instruction is received, the process flow 1000 may conclude at operation 1006.

A database instruction may be in SQL or another suitable database instruction protocol. In some examples, the database management system 102 supports different certificate-related database instructions. In some examples, the database management system 102 supports database instruction to alter a root certificate used for some or all of the database hosts 106, 108, 110 of the database management system 102. Also, in some examples, the database management system 102 supports database instructions to alter a host certificate for one or more of the database hosts 106, 108, 110. Altering a certificate (e.g., a host certificate or a root certificate) may include, for example, removing the certificate, modifying the certificate, generating a new certificate, and/or the like. If a database instruction is received at operation 1002, the database management system 102 may execute the received instruction at operation 1006, for example, by altering one or more host certificates and/or one or more root certificates at operation 1004. The process flow 1000 may conclude at operation 1006. In some examples, the process flow 1000 is executed by the database management system 102 periodically and/or continuously.

Figure 11:
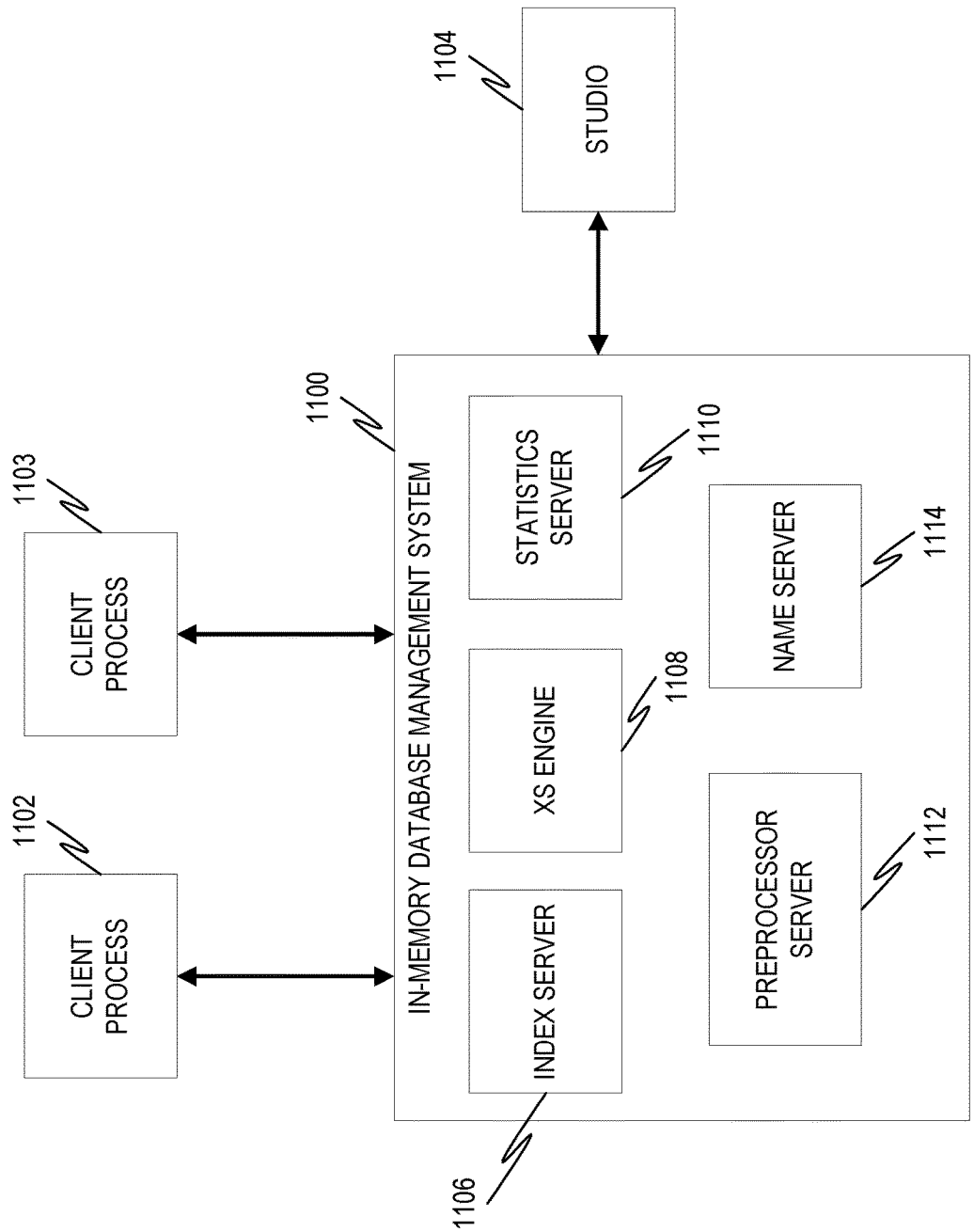
FIG. 11 is a diagram illustrating an example of an in-memory database management system.
Figure 12:
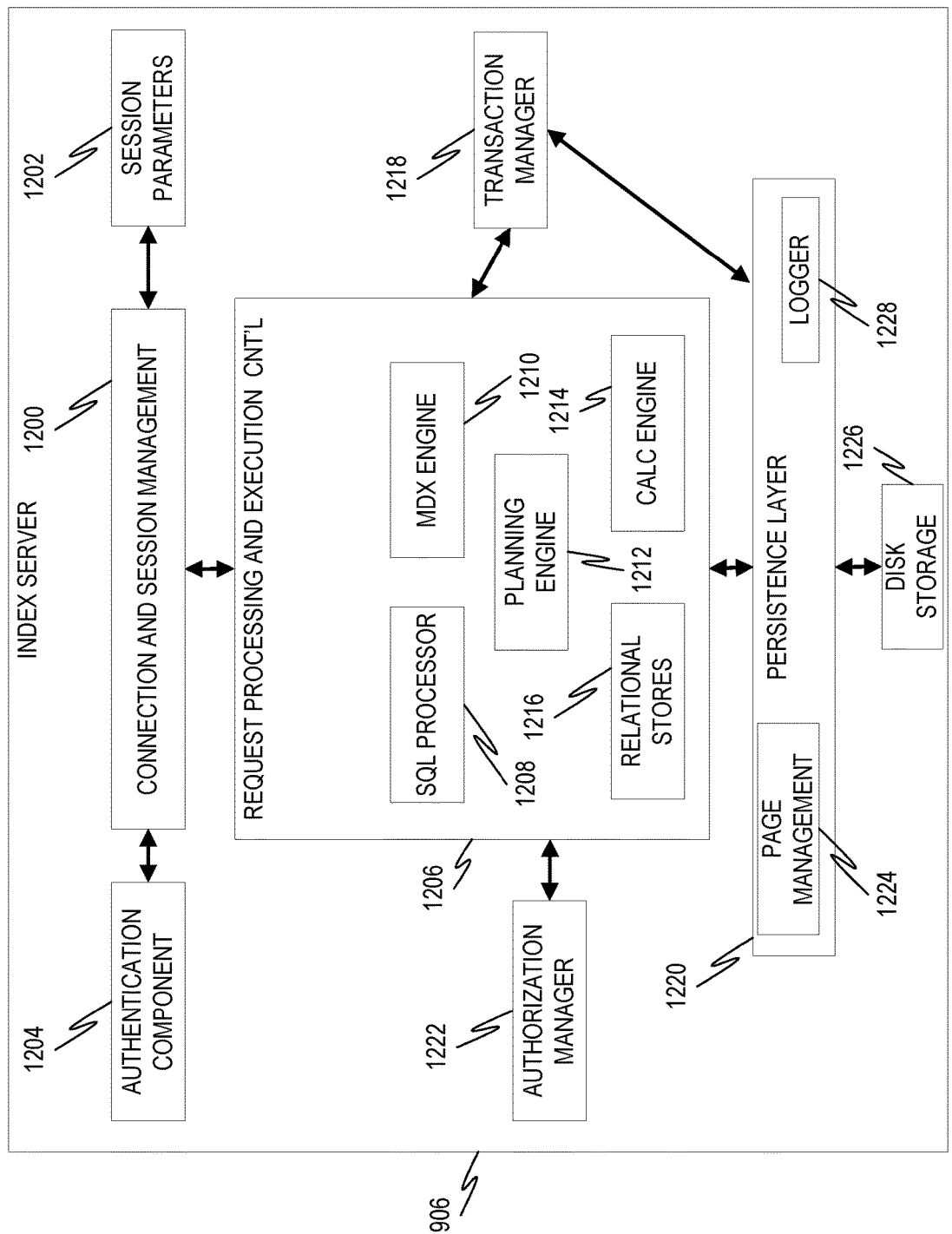
FIG. 12 is a diagram illustrating an example of the index server of FIG. 11.
Figure 13:
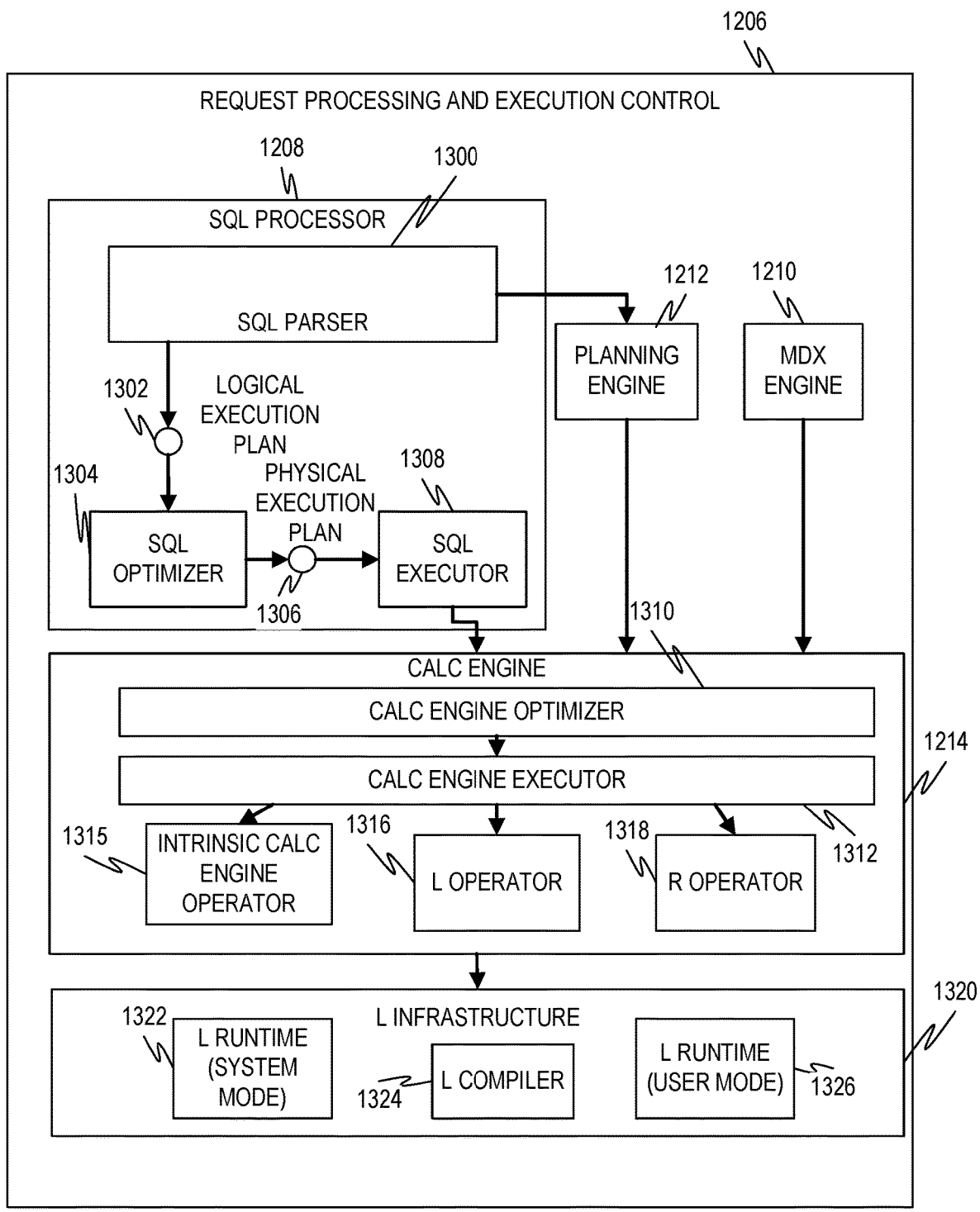
FIG. 13 is a diagram illustrating one example of the request processing and execution control of FIG. 12.

FIGS. 11-13 provide examples of the operation of an in-memory database management system 1100 and an associated suite of client processes 1102, 1103. For example, the database management system 1100 is one example way to implement the database management system 102 of FIG. 1. Also, the client processes 1102, 1103 may be similar to the client 104 and may establish secure communication connections with various database hosts of the database management system 1100 as described herein.

FIG. 11 is a diagram illustrating an example of an in-memory database management system 1100. An in-memory database stores data primarily at main memory, such as a random access memory. This is different than databases that primarily employ a disk storage mechanism. In some examples, the database management system 1100 may be or include an example of the HANA™ system from SAP SE of Walldorf, Germany. Although various features of the waste disposal process described herein may be performed in the context of an in-memory database, other databases and database management systems may be used as well.

The in-memory database management system 1100 may be coupled to one or more client processes 1102, 1103. Client processes 1102, 1103 may perform operations similar to those of the client 104 of FIG. 1. For example, the client processes 1102, 1103 may establish secure communication connections with one or more database hosts of the database management system 1100 according to the examples described herein. The client processes 1102, 1103 may communicate with the in-memory database management system 1100 through a number of different protocols, including Structured Query Language (SQL), Multidimensional Expressions (MDX), Hypertext Transfer Protocol (HTTP), Representational State Transfer (REST), Hypertext Markup Language (HTML). For example, the various documents and data structures described herein with respect to FIGS. 3 and 11 may be stored and managed by the database management system 1100.

FIG. 11 also shows a studio 1104 that may be used to perform modeling by accessing the in-memory database management system 1100. In some examples, the studio 1104 may allow complex analysis to be performed on data drawn not only from real time event data and windows, but also from stored database information.

The in-memory database management system 1100 may comprise a number of different components, including an index server 1106, an XS engine 1108, a statistics server 1110, a preprocessor server 1112, and a name server 1114. These components may operate on a single computing device or may be spread among multiple computing devices (e.g., separate servers). The index server 1106 contains the actual data and the engines for processing the data. It may also coordinate and uses the other servers.

The XS engine 1108 allows clients to connect to the in-memory database management system 1100 using web protocols, such as HTTP. Although the XS engine 1108 is illustrated as a component of the in-memory database management system 1100, in some examples, the XS engine may be implemented as one or more Application Program Interfaces (APIs) and/or services positioned between the client processes 1102, 1103 and the in-memory database management system 1100. In some examples, the XS engine 1108 may handle client requests received in languages other than SQL such as, for example, MDX, HTTP, REST, HTML, and so forth.

The statistics server 1110 collects information about status, performance, and resource consumption from all the other server components. The statistics server 1110 can be accessed from the studio 1104 to obtain the status of various alert monitors.

The preprocessor server 1112 is used for analyzing text data and extracting the information on which the text search capabilities are based.

The name server 1114 holds information about the database topology. This is used in a distributed system with instances of the database on different hosts. The name server 1114 knows where the components are running and which data is located on which server. In an example embodiment, a separate enqueue server may operate in the manner described above with respect to enqueue servers, specifically with regard to creating and managing light-weight enqueue sessions.

FIG. 12 is a diagram illustrating an example of the index server 1106. Specifically, the index server 1106 of FIG. 11 is depicted in more detail. The index server 1106 includes a connection and session management component 1200, which is responsible for creating and managing sessions and connections for the database clients (e.g. client processes 1102, 1103). Once a session is established, clients can communicate with the database system using SQL statements. For each session, a set of session parameters 1202 may be maintained, such as auto-commit, current transaction isolation level, and so forth. Users (e.g., system administrators, developers) may be authenticated by the database system itself (e.g., by logging in with log-in information such as a username and password, using an authentication component 1204) or authentication can be delegated to an external authentication provider such as a Lightweight Directory Access Protocol (LDAP) directory.

Client requests, such as contract form requests, can be analyzed and executed by a set of components summarized as request processing and execution control 1206. An SQL processor 1208 checks the syntax and semantics of the client SQL statements and generates a logical execution plan. MDX is a language for querying and manipulating multi-dimensional data stored in Online Analytical Processing (OLAP) cubes. As such, an MDX engine 1210 may be provided to allow for the parsing and executing of MDX commands. A planning engine 1212 allows applications to execute basic planning operations in the database layer. One such operation is to create a new version of a dataset as a copy of an existing dataset, while applying filters and transformations.

A calculation engine 1214 implements the various SQL script and planning operations. The calculation engine 1214 creates a logical execution plan for calculation models derived from SQL script, MDX, planning, and domain-specific models. This logical execution plan may include, for example, breaking up a model into operations that can be processed in parallel. The data is stored in relational stores 1216, which implement a relational database in main memory. Each SQL statement may be processed in the context of a transaction. New sessions are implicitly assigned to a new transaction. A transaction manager 1218 coordinates database transactions, controls transactional isolation, and keeps track of running and closed transactions. When a transaction is committed or rolled back, the transaction manager 1218 informs the involved engines about this event so they can execute needed actions. The transaction manager 1218 also cooperates with a persistence layer 1220 to achieve atomic and durable transactions.

An authorization manager 1222 is invoked by other database system components to check whether the user has the specified privileges to execute the requested operations. The database system allows for the granting of privileges to users or roles. A privilege grants the right to perform a specified operation on a specified object.

The persistence layer 1220 ensures that the database is restored to the most recent committed state after a restart and that transactions are either completely executed or completely undone. To achieve this goal in an efficient way, the persistence layer 1220 uses a combination of write-ahead logs, shadow paging, and save points. The persistence layer 1220 also offers a page management interface 1224 for writing and reading data to a separate disk storage 1226 and also contains a logger 1228 that manages the transaction log. Log entries can be written implicitly by the persistence layer 1220 when data is written via the persistence interface or explicitly by using a log interface.

FIG. 13 is a diagram illustrating one example of the request processing and execution control 1206. This diagram depicts the request processing and execution control 1206 of FIG. 12 in more detail. The SQL processor 1308 contains an SQL parser 1300, which parses the SQL statement and generates a logical execution plan 1302, which it passes to an SQL optimizer 1304. The SQL optimizer 1304 optimizes the logical execution plan 1302 and converts it to a physical execution plan 1306, which it then passes to a SQL processor 1308. The calculation engine 1214 implements the various SQL script and planning operations, and includes a calc engine optimizer 1310, which optimizes the operations, and a calc engine executor 1312, which executes the operations. The calculation engine 1214 also includes an intrinsic calc engine operator 1315, an L operator 1316, and an R operator 1318.

An L infrastructure 1320 includes a number of components to aid in the running of L procedures, including an L-runtime (system mode) 1322, an L compiler 1324, and an L-runtime (User mode) 1326.

In view of the disclosure above, various examples are set forth below. It should be noted that one or more features of an example, taken in isolation or combination, should be considered within the disclosure of this application.

Examples: Example 1 is a database management system comprising a plurality of database hosts, comprising: at least one processor programmed to perform operations comprising: generating a root certificate for a database host of the database management system; generating a first host certificate using the root certificate, the first host certificate being for a first database host corresponding to a first tenant of the database host; receiving, from a first client associated with the first tenant, a request to access the root certificate stored at a root certificate storage location, the first client executing at a client computing device; sending the root certificate to the first client; receiving, from the first client, a request to establish a secure communication connection; and establishing the secure communication connection with the first client at least in part by providing the first host certificate to the first client.

In Example 2, the subject matter of Example 1 optionally includes the operations further comprising: receiving, from the first client, a request to establish a preliminary communication connection; and establishing the preliminary communication connection, the request to access the root certificate being received via the preliminary communication connection, and the sending of the root certificate to the first client being via the preliminary communication connection.

In Example 3, the subject matter of any one or more of Examples 1-2 optionally includes the root certificate storage location being a view, the request to access the root certificate comprising a request to generate the view.

In Example 4, the subject matter of any one or more of Examples 1-3 optionally includes the root certificate storage location being a storage location accessible to an administrator account at the database host, the operations further comprising: receiving, from the first client, administrator credential data associated with the administrator account at the database host; and after receiving the administrator credential data, accessing the root certificate from the storage location accessible to the administrator account.

In Example 5, the subject matter of any one or more of Examples 1-4 optionally includes the operations further comprising: starting-up the database host; and determining that no root certificate is stored at the root certificate storage location, the generating of the root certificate being based at least in part on the determining that no root certificate is stored at the database host.

In Example 6, the subject matter of any one or more of Examples 1-5 optionally includes the operations further comprising: determining that an age of the first host certificate is greater than a threshold age; and based on the determining that the age of the first host certificate is greater than the threshold age, generate a second host certificate corresponding to the first tenant of the database host.

In Example 7, the subject matter of any one or more of Examples 1-6 optionally includes the operations further comprising: starting-up the database host; determining that a secure communication feature is not active; and deleting the first host certificate.

In Example 8, the subject matter of any one or more of Examples 1-7 optionally includes the first tenant of the database host associated with a first host, the operations further comprising: receiving a request to add a second host to the database host; and generating configuring a second host certificate using the root certificate, the second host certificate corresponding to the second host.

In Example 9, the subject matter of Example 8 optionally includes the operations further comprising: receiving, from a second client computing device, a request to access the root certificate; and sending the root certificate to the second client computing device.

Example 10 is a communication method for a database management system comprising a plurality of database hosts, comprising: generating, by the database management system, a root certificate for a database host of the database management system; generating, by the database management system, a first host certificate using the root certificate, the first host certificate being for a first database host corresponding to a first tenant of the database host; receiving, by a first database host and from a first client associated with the first tenant, a request to access the root certificate stored at a root certificate storage location, the first client executing at a client computing device; sending, by the database host, the root certificate to the first client; receiving, by the database host and from the first client, a request to establish a secure communication connection; and establishing the secure communication connection with the first client at least in part by providing the first host certificate to the first client.

In Example 11, the subject matter of Example 10 optionally includes receiving, from the first client, a request to establish a preliminary communication connection; and establishing the preliminary communication connection, the request to access the root certificate being received via the preliminary communication connection, and the sending of the root certificate to the first client being via the preliminary communication connection.

In Example 12, the subject matter of any one or more of Examples 10-11 optionally includes the root certificate storage location being a view, the request to access the root certificate comprising a request to generate the view.

In Example 13, the subject matter of any one or more of Examples 10-12 optionally includes the root certificate storage location being a storage location accessible to an administrator account at the database host, the method further comprising: receiving, from the first client, administrator credential data associated with the administrator account at the database host; and after receiving the administrator credential data, accessing the root certificate from the storage location accessible to the administrator account.

In Example 14, the subject matter of any one or more of Examples 10-13 optionally includes starting-up the database host; and determining, by the database host, that no root certificate is stored at the root certificate storage location, the generating of the root certificate being based at least in part on the determining that no root certificate is stored at the database host.

In Example 15, the subject matter of any one or more of Examples 10-14 optionally includes determining, by the database host, that an age of the first host certificate is greater than a threshold age; and based on the determining that the age of the first host certificate is greater than the threshold age, generate a second host certificate corresponding to the first tenant of the database host.

In Example 16, the subject matter of any one or more of Examples 10-15 optionally includes starting-up the database host; determining, by the database host, that a secure communication feature is not active; and deleting, by the database host, the first host certificate.

In Example 17, the subject matter of any one or more of Examples 10-16 optionally includes the first tenant of the database host associated with a first host, the method further comprising: receiving, by the database host, a request to add a second host to the database host; and configuring generating, by the database host, a second host certificate using the root certificate, the second host certificate corresponding to the second host.

In Example 18, the subject matter of Example 17 optionally includes receiving, by the database host and from a second client computing device, a request to access the root certificate; and sending, by the database host and to the second client computing device, the root certificate.

Example 19 is a non-transitory machine-readable medium comprising instructions thereon that, when executed by at least one processor, cause the at least one processor to perform operations comprising: generating a root certificate for a database host of a database management system; generating a first host certificate using the root certificate, the first host certificate being for a first database host corresponding to a first tenant of the database host; receiving, from a first client associated with the first tenant, a request to access the root certificate stored at a root certificate storage location, the first client executing at a client computing device; sending the root certificate to the first client; receiving, from the first client, a request to establish a secure communication connection; and establishing the secure communication connection with the first client at least in part by providing the first host certificate to the first client.

In Example 20, the subject matter of Example 19 optionally includes the operations further comprising: receiving, from the first client, a request to establish a preliminary communication connection; and establishing the preliminary communication connection, the request to access the root certificate being received via the preliminary communication connection, and the sending of the root certificate to the first client being via the preliminary communication connection.

Figure 14:
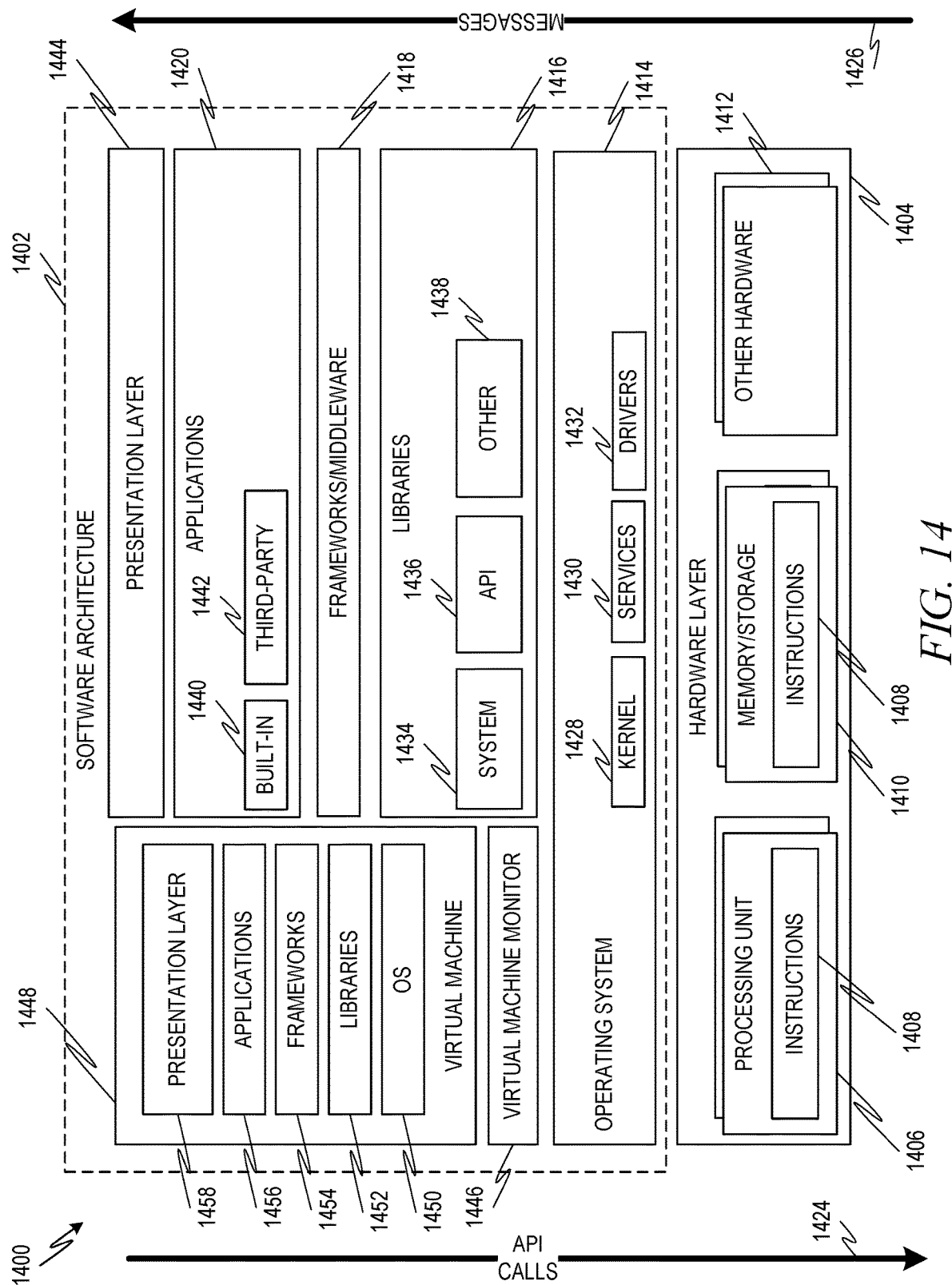
FIG. 14 is a block diagram showing one example of a software architecture for a computing device.

FIG. 14 is a block diagram 1400 showing one example of a software architecture 1402 for a computing device. The software architecture 1402 may be used in conjunction with various hardware architectures, for example, as described herein. FIG. 14 is merely a non-limiting example of a software architecture and many other architectures may be implemented to facilitate the functionality described herein. A hardware layer 1404 is illustrated and can represent, for example, any of the above referenced computing devices. In some examples, the hardware layer 1404 may be implemented according to the architecture of the computer system of FIG. 14.

The hardware layer 1404 comprises one or more processing units 1406 having associated executable instructions 1408. Executable instructions 1408 represent the executable instructions of the software architecture 1402, including implementation of the methods, modules, subsystems, and components, and so forth described herein and may also include memory and/or storage modules 1410, which also have executable instructions 1408. Hardware layer 1404 may also comprise other hardware as indicated by other hardware 1412, which represents any other hardware of the hardware layer 1404, such as the other hardware illustrated as part of the software architecture 1402.

In the example architecture of FIG. 14, the software architecture 1402 may be conceptualized as a stack of layers where each layer provides particular functionality. For example, the software architecture 1402 may include layers such as an operating system 1414, libraries 1416, middleware layer 1418, applications 1420, and presentation layer 1444. Operationally, the applications 1420 and/or other components within the layers may invoke API calls 1424 through the software stack and access a response, returned values, and so forth illustrated as messages 1426 in response to the API calls 1424. The layers illustrated are representative in nature and not all software architectures have all layers. For example, some mobile or special purpose operating systems may not provide a middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of an interrupt and, in response, cause the software architecture 1402 to pause its current processing and execute an interrupt service routine (ISR) when an interrupt is accessed.

The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the operating system 1414 functionality (e.g., kernel 1428, services 1430 and/or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The middleware layer 1418 (also sometimes referred to as a frameworks layer) may provide a higher-level common infrastructure that may be utilized by the applications 1420 and/or other software components/modules. For example, the middleware layer 1418 may provide various graphic user interface (GUI) functions, high-level resource management, high-level location services, and so forth. The middleware layer 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a contacts application, a browser application, a book reader application, a location application, a median application, a messaging application, and/or a game application. Third-party applications 1442 may include any of the built-in applications 1440 as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1442 may invoke the API calls 1424 provided by the mobile operating system such as operating system 1414 to facilitate functionality described herein.

The applications 1420 may utilize built-in operating system functions (e.g., kernel 1428, services 1430, and/or drivers 1432), libraries (e.g., system libraries 1434, API libraries 1436, and other libraries 1438), and middleware layer 1418 to create user interfaces to interact with users of the system. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware computing device. A virtual machine is hosted by a host operating system (operating system 1414) and typically, although not always, has a virtual machine monitor 1446, which manages the operation of the virtual machine 1448 as well as the interface with the host operating system (i.e., operating system 1414). A software architecture executes within the virtual machine 1448 such as an operating system 1450, libraries 1452, frameworks/middleware 1454, applications 1456, and/or presentation layer 1458. These layers of software architecture executing within the virtual machine 1448 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 15:
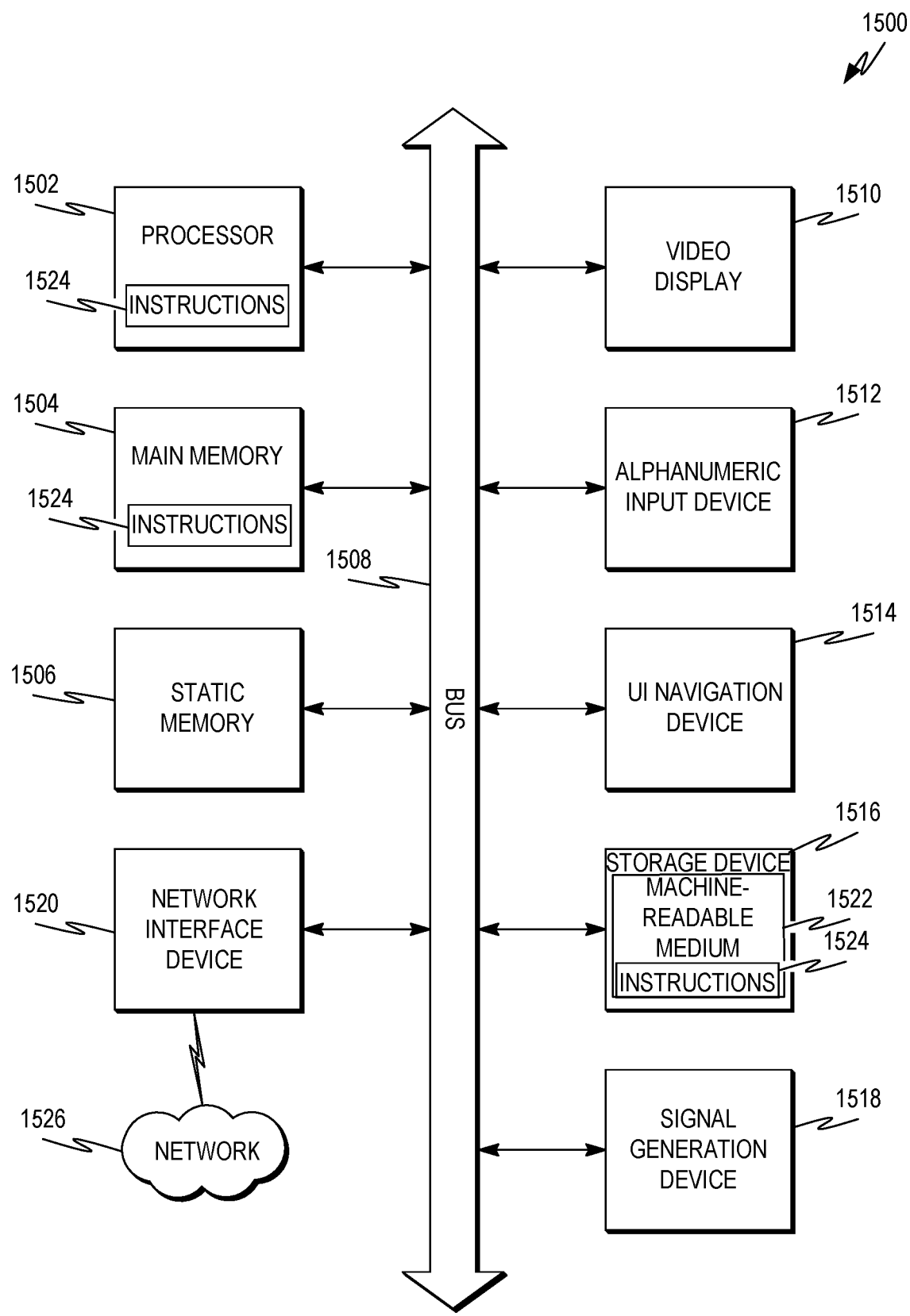
FIG. 15 is a block diagram of a machine in the example form of a computer system within which instructions may be executed for causing the machine to perform any one or more of the methodologies discussed herein.

FIG. 15 is a block diagram of a machine in the example form of a computer system 1500 within which instructions 1524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface navigation (or cursor control) device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable medium 1522.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding, or carrying instructions 1524 for execution by the machine and that cause the machine to perform any one or more of the methodologies of the present disclosure, or that is capable of storing, encoding, or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A multi-tenant database management system comprising a plurality of database hosts, comprising:
    at least one processor programmed to perform operations comprising:
        generating a root certificate for a first tenant of the database management system, the root certificate indicating a portion of the plurality of database hosts associated with the first tenant;
        generating a first host certificate using the root certificate, the first host certificate being for a first database host of the portion of the plurality of database hosts associated with the first tenant;

receiving, from a first client associated with the first tenant, a request to access the root certificate stored at a root certificate storage location, the first client executing at a client computing device;

responsive to the request to access the root certificate, sending the root certificate to the first client;

after sending the root certificate to the first client, receiving, from the first client, a request to establish a secure communication connection; and establishing the secure communication connection with the first client at least in part by providing the first host certificate to the first client.

2. The system of claim 1, the operations further comprising:

receiving, from the first client, a request to establish a preliminary communication connection; and establishing the preliminary communication connection, the request to access the root certificate being received via the preliminary communication connection, and the sending of the root certificate to the first client being via the preliminary communication connection.

3. The system of claim 1, the root certificate storage location being a view, the request to access the root certificate comprising a request to generate the view.

4. The system of claim 1, the root certificate storage location being a storage location accessible to an administrator account at the database management system, the operations further comprising:

receiving, from the first client, administrator credential data associated with the administrator account at the database management system; and after receiving the administrator credential data, accessing the root certificate from the storage location accessible to the administrator account.

5. The system of claim 1, the operations further comprising:

starting-up the database management system; and determining that no root certificate is stored at the root certificate storage location, the generating of the root certificate being based at least in part on the determining that no root certificate is stored at the database management system.

6. The system of claim 1, the operations further comprising:

determining that an age of the first host certificate is greater than a threshold age; and based on the determining that the age of the first host certificate is greater than the threshold age, generate a second host certificate corresponding to the first tenant of the database management system.

7. The system of claim 1, the operations further comprising:

starting-up the database management system;

determining that a secure communication feature is not active; and deleting the first host certificate.

8. The system of claim 1, the first tenant of the database management system associated with a first host, the operations further comprising:

receiving a request to add a second host to the database management system; and configuring a second host certificate using the root certificate, the second host certificate corresponding to the second host.

9. The system of claim 8, the operations further comprising:

receiving, from a second client computing device, a request to access the root certificate; and sending the root certificate to the second client computing device.

10. A communication method for a database management system comprising a plurality of database hosts, comprising:

generating, by the database management system, a root certificate for a first tenant of the database management system, the root certificate indicating a portion of the plurality of database hosts associated with the first tenant;

generating, by the database management system, a first host certificate using the root certificate, the first host certificate being for a first database host of the portion of the plurality of database hosts associated with the first tenant;

receiving, by the first database host and from a first client associated with the first tenant, a request to access the root certificate stored at a root certificate storage location, the first client executing at a client computing device;

responsive to the request to access the root certificate, sending, by the database management system, the root certificate to the first client;

after sending the root certificate to the first client, receiving, by the database management system and from the first client, a request to establish a secure communication connection; and establishing the secure communication connection with the first client at least in part by providing the first host certificate to the first client.

11. The communication method of claim 10, further comprising:

receiving, from the first client, a request to establish a preliminary communication connection; and establishing the preliminary communication connection, the request to access the root certificate being received via the preliminary communication connection, and the sending of the root certificate to the first client being via the preliminary communication connection.

12. The communication method of claim 10, the root certificate storage location being a view, the request to access the root certificate comprising a request to generate the view.

13. The communication method of claim 10, the root certificate storage location being a storage location accessible to an administrator account at the database management system, the method further comprising:

receiving, from the first client, administrator credential data associated with the administrator account at the database management system; and after receiving the administrator credential data, accessing the root certificate from the storage location accessible to the administrator account.

14. The communication method of claim 10, further comprising:

starting-up the database management system; and determining, by the database management system, that no root certificate is stored at the root certificate storage location, the generating of the root certificate being based at least in part on the determining that no root certificate is stored at the database management system.

15. The communication method of claim 10, further comprising:

determining, by the database management system, that an age of the first host certificate is greater than a threshold age; and based on the determining that the age of the first host certificate is greater than the threshold age, generate a second host certificate corresponding to the first tenant of the database management system.

16. The communication method of claim 10, further comprising:
   starting-up the database management system;
   determining, by the database management system, that a secure communication feature is not active; and
   deleting, by the database management system, the first host certificate.

17. The communication method of claim 10, further comprising:
   receiving, by the database management system, a request to add a second host to the database host; and
   configuring, by the database management system, a second host certificate using the root certificate, the second host certificate corresponding to the second host.

18. The communication method of claim 17, further comprising:
   receiving, by the database management system and from a second client computing device, a request to access the root certificate; and
   sending, by the database management system and to the second client computing device, the root certificate.

19. A non-transitory machine-readable medium comprising instructions thereon that, when executed by at least one processor, cause the at least one processor to perform operations comprising:
   generating a root certificate for a first tenant of a multi-tenant database management system comprising a plurality of database hosts, the root certificate indicating a portion of the plurality of database hosts associated with the first tenant;
   generating a first host certificate using the root certificate, the first host certificate being for a first database host of the portion of the plurality of database hosts associated with the first tenant;
   receiving, from a first client associated with the first tenant, a request to access the root certificate stored at a root certificate storage location, the first client executing at a client computing device;
   responsive to the request to access the root certificate, sending the root certificate to the first client;
   after sending the root certificate to the first client, receiving, from the first client, a request to establish a secure communication connection; and
   establishing the secure communication connection with the first client at least in part by providing the first host certificate to the first client.

20. The medium of claim 19, the operations further comprising:
   receiving, from the first client, a request to establish a preliminary communication connection; and
   establishing the preliminary communication connection, the request to access the root certificate being received via the preliminary communication connection, and the sending of the root certificate to the first client being via the preliminary communication connection.

* * * * *